United States Patent [19]
McKay et al.

[11] Patent Number: 5,276,679
[45] Date of Patent: Jan. 4, 1994

[54] METHOD FOR MAINTAINING CHANNELS AND A SUBSCRIBER STATION FOR USE IN AN ISDN SYSTEM

[75] Inventors: Thomas D. McKay, Bloomfield; James C. Shelby, Aurora; Martin D. Siebring, Parker, all of Colo.

[73] Assignee: U.S. West Advanced Technologies, Inc., Boulder, Colo.

[21] Appl. No.: 834,605

[22] Filed: Feb. 12, 1992

[51] Int. Cl.⁵ .............................. H04J 3/22
[52] U.S. Cl. ...................... 370/84; 370/100.1
[58] Field of Search ............ 370/84, 94.1, 94.2, 370/110.1, 85.7, 95.1, 100.1, 105.2, 60, 60.1, 58.1; 379/96

[56] References Cited

U.S. PATENT DOCUMENTS

| | | |
|---|---|---|
| H586,000 | 2/1989 | Kun . |
| 4,387,271 | 6/1983 | Artom . |
| 4,688,168 | 8/1987 | Gudaitis et al. . |
| 4,703,475 | 10/1987 | Dretzlea et al. ............ 370/94.1 |
| 4,748,656 | 5/1988 | Gribbs et al. ............... 379/96 |
| 4,763,319 | 8/1988 | Rosenblit .................... 370/84 |
| 4,827,409 | 5/1989 | Dickson . |
| 4,829,227 | 5/1989 | Turner ........................ 370/84 |
| 4,866,703 | 9/1989 | Black et al. . |
| 4,870,641 | 9/1989 | Paltavina .................. 370/94.1 |
| 4,878,216 | 10/1989 | Yunoki . |
| 4,914,574 | 4/1990 | Terada et al. . |
| 4,937,734 | 6/1990 | Bechtolsheim . |
| 4,970,723 | 11/1990 | Lin . |
| 4,985,891 | 1/1991 | Fukiwara et al. . |
| 4,996,685 | 2/1991 | Farese et al. ............... 370/58.1 |

Primary Examiner—Douglas W. Olms
Assistant Examiner—Hassan Kizou
Attorney, Agent, or Firm—Brooks & Kushman

[57] ABSTRACT

A method and at least one subscriber station utilizes a software package in combination with at least one terminal adapter which links ISDN circuit-switched channels, such as "B", "H0", "H10", "H11" and the like, into a single logical connection and synchronizes the linked channels in an ISDN system. The station allows a subscriber to dynamically select various bandwidths (i.e. different channels) for data transfer, such as text or graphics. The software package and, preferably, multiple terminal adapters, reside on a personal computer and also permits simultaneous messaging and voice functions between several such subscriber stations. Any number of logical channels can be managed. ISDN data is segmented based on the channel's respective data rates and thereafter simultaneously sent on the channels of the logical connection. ISDN data is consequently transferred at a rate greater than the rate available on any single ISDN channel.

45 Claims, 20 Drawing Sheets

PRIOR ART

Setup Call Window

Dialing Directory Window

Disconnect Call Window

Incoming Call Window

Select File To Send Window

Send File Window

Receive File Window

Chat Session Window

METHOD FOR MAINTAINING CHANNELS AND A SUBSCRIBER STATION FOR USE IN AN ISDN SYSTEM

TECHNICAL FIELD

This invention relates to methods and subscriber stations for use in ISDN systems and, in particular, to methods and subscriber stations for logically combining ISDN circuit-switched channels to provide relatively high speed communication between several such subscriber stations.

BACKGROUND ART

It is desirable to achieve high speed data transfer over circuit-switched channels at a rate above the rate available on any one circuit-switched channel. Although the capability currently exists, solutions have been costly.

An existing hardware solution is illustrated in FIG. 1. This method requires one or more external terminal adapters, a multiplexer, cabling, and a sync board for a PC. The system's cost is directly proportional to the available bandwidth.

Additionally, U.S. Pat. No. 4,387,271, issued to Artom, discloses a combined telephone and data-transfer system. The system makes use of common data network and data retrieval units to effect transmission of data on subscriber lines at frequencies outside the voice band. The data is divided into groups which are preceded by an address code.

U.S. Pat. No. 4,688,168, issued to Gudaitis et al., discloses a high speed data transfer method and apparatus. The apparatus includes a bus master controller which sequences through source and destination addresses at a rate greater than the connected units' ability to transfer data, thereby enhancing the speed of data transmission. The high speed data bus includes separate data transfer and master control bus portions.

U.S. Pat. No. 4,827,409, issued to Dickson, discloses a high speed interconnect unit for a digital data processing system. The interconnect unit includes a bus for transferring both control and user information between the unit and an external device. A simplified protocol accommodates "stalls" between the communicating devices during transfer.

U.S. Pat. No. 4,866,703, issued to Black et al., discloses an ISDN module having a time division multiplexed (TDM) switching network. Facility interface cards connect subscribers to the TDM network and provide for two-wire and four-wire subscriber connections, T1 line connections and three port conferencing arrangements. Subsystems are connected by an Ethernet LAN, allowing the system to provide both Primary Rate and Basic Rate Interfaces to subscribers.

U.S. Statutory Invention H586, issued to Kun, discloses an ISDN D-Channel handler. The ISDN network utilizes TDM and the handler, in an exchange termination (ET) collects and distributes D-channel data to various subscriber lines. A translator accesses the data and passes supervisory and signalling information contained therein to a central processor in the ET. This information is then formatted according to the International Telegraph and Telephone Consultative Communication (CCITT) standard and transmitted to the intended subscriber on the appropriate D-channel.

U.S. Pat. No. 4,878,216, issued to Yunoki, discloses a method for the management of logical channels for ISDN packet service between and ISDN and subscribers. The method allocates a logical channel group number (LCGN) in the ISDN in advance for each piece of data terminal equipment in a subscriber station. The terminal equipments notifies the ISDN of the LCGN, enabling the ISDN to offer communication service without separate management of the each piece of data terminal equipment at each subscriber site.

U.S. Pat. No. 4,914,574, issued to Terada et al., discloses a data transmission apparatus having cascaded data processing modules for daisy chain data transferring. The apparatus utilizes a plurality of data processing modules, each functional as a computer. Required sequence setting of the input/output ports of each module is performed by a port sequencer. The daisy chain transfer of the selective, load distribution and collective data transfers is combined between the data processing modules, thereby resulting in a high speed and efficient data transmission.

U.S. Pat. No. 4,937,734, issued to Bechtolsheim, discloses a high speed bus with a virtual memory data transfer and rerun cycle capability. A virtual memory scheme allows high speed data transfer, minimizing the number of lines required to implement the bus. The idle time of a particular device is also minimized.

U.S. Pat. No. 4,970,723, issued to Lin, discloses an ISDN basic rate interface (BRI) arranged for quad voice operation. The ISDN BR is interposed between a switch and a plurality of voice or data terminals, thereby enabling at least three voice terminals (or a data terminal and two voice terminals) to operate simultaneously through the B-channels of the BRI to the switch. To allow for the service, voice samples are digitized by a code converter.

U.S. Pat. No. 4,985,891, issued to Fujiwara et al., discloses an ISDN system having a subscriber line multiplexer with means for reducing the load on an ISDN switch by establishing different data links through D-channels on the subscriber line. The multiplexer comprises subscriber interfaces connected to digital subscriber lines (DSLs) and statistically multiplexes a plurality of signals for Link Access Procedure on D-channels (LAPDs) to form an additional data link between each subscriber interface and the ISDN switch, thereby reducing the load on the ISDN switch.

SUMMARY OF THE INVENTION

The present invention will provide a plurality of services to the user for performing various communication tasks over ISDN lines. These services include high speed data (file, text, graphics, etc.) transferring, messaging, and voice functions. Additionally, the invention utilizes a windowed interface and allows for these services to be active simultaneously.

It is therefore an object of the present invention to provide a method and at least one subscriber station in an ISDN system for logically combining ISDN circuit-switched channels to achieve a relatively high speed data transfer rate in a cost efficient fashion.

It is a further object of the present invention to provide a method and at least one subscriber station in an ISDN system for logically combining ISDN circuit-switched channels to achieve a data transfer rate greater than the rate available on any single ISDN channel.

It is yet another object of the present invention to provide a method and at least one subscriber station in an ISDN system for logically combining ISDN circuit-switched channels to achieve file transfer, messaging and voice communication capabilities.

It is still another object of the invention that while a data connection exists, either side will be able to send messages to the other side. Additionally, each side has an area where messages will appear as they are received.

In carrying out the above objects and other objects of the present invention, a method for maintaining a plurality of ISDN circuit-switched channels in an ISDN is provided. The ISDN is used for performing various communication tasks including transferring data between subscriber stations. Each of the channels has a known bandwidth. At least one of the subscriber stations includes a computer having an internal bus and at least one terminal adapter (TA) for coupling the channels to the internal bus. The method includes the steps of linking several of the plurality of channels into a single logical connection, and synchronizing the channels of the single logical connection to permit the data to be transferred to a second subscriber station at a first rate greater than the rate available on any one of the linked ISDN circuit-switched channels.

In further carrying out the above objects and other objects of the present invention, subscriber stations are provided in an ISDN system. The ISDN system performs various communication tasks including transferring data between subscriber stations over a plurality of ISDN circuit-switched channels. Each of the channels has a known bandwidth. At least one of the subscriber stations includes a computer having an internal bus and at least one terminal adapter for coupling the channels to the internal bus. The at least one subscriber station also includes link means associated with the computer for linking several of the plurality of channels into a single logical connection and synchronizing means associated with the computer for synchronizing the channels of the single logical connection to permit the data to be transferred between the first and second stations at a rate greater than the rate available on any one of the linked ISDN circuit-switched channels.

Preferably, the data appears to a user to be transferred as a single bit stream on a computer over ISDN lines to achieve data rates greater than the rate available on any single circuit-switched ISDN channel.

Also preferably, the method and subscriber stations utilize a high speed data transfer (HSDT) software package that resides on a computer that links and synchronizes ISDN circuit-switched channels of similar and dissimilar data rates some or all of which exist on multiple ISDN channels. A subscriber has the flexibility to select various bandwidths in a dynamic fashion for data rate transfer with independent voice grade capability.

The HSDT software package may exist as source code or object code found in an object library or an executable file on any general purpose computer. Preferably, a subscriber provides information through software function calls. Multiple physical ISDN circuit-switched channels are maintained to appear as a single logical connection. The software package segments user data to match various data rates to be sent simultaneously on each physical channel. Any number of logical channels are maintained (up to the number of available channels).

The software package includes a software interface to internal ISDN TA's (i.e. TA's that provide data transfer capability on Circuit Switched Channels and 'D' type packet switched channels to the general purpose computer's internal bus) and a list of phone numbers and rate adaptation capabilities on a per channel basis.

On a per logical connection basis, the software package includes (1) a reference to an area in memory to receive data; (2) requested bandwidth by specifying a list of rate adaptations to be assigned to this single logical connection; and (3) a phone number (ISDN address) of a remote process.

Preferably, the HSDT software package performs the following steps to establish the single logical connection: (1) matches each given rate adaptation with an available channel; (2) sends the rate adaptation list to the remote process using the given phone number (or ISDN address), and phone number to dial back; (3) the remote process delivers this list to the user of the software; (4) allows the subscriber to modify the rate adaptations and/or eliminate some, and presents this list back to the software package; (5) matches this new list to available compatible channels; (6) sends back the modified list along with phone numbers for each channel; (7) each channel is dialed up in order to make the physical connection using the new rate adaptation list; and (8) once all the channels in the list are established as physical connections, the subscriber is given a 'handle' on this one logical connection.

The HSDT software package also preferably initiates receives of data (pending requests) to allow the remote process to send data at any time, simultaneous on all channels at their respective data rates. The locations for receives are references to segments of varying length based on each circuit-switched channel's data rate.

The software package also allows data to be sent over the logical connection by providing: (1) reference in memory to a contiguous block of data to be sent; and (2) length of data to send.

In preparing to send data, the software package breaks data up into segments of varying length, one for each physical channel. The length is proportional to each channel's data rate. In segmenting the data, the following preferably occurs: (1) a request is made to send a block of data; (2) the block is segmented in pieces proportional to the bandwidth of the channels available, as separate blocks of data, one for each channel; (3) a request is made to the PCTA for each channel to transmit a block of data; (4) the transmitted segmented data is regrouped back to the original block after the data is transferred over the network; and (5) notice is given to the sending user that the transfer is complete.

The HSDT software package initiates sending each segment over physical channels such that the transfer of data occurs simultaneously at the channels' respective data rates. When all segments of the logical connection have been received at the remote process side, the following preferably occurs: (1) the subscriber is given an indication that a block of data has arrived along with the total length of said data; (2) the subscriber provides a reference to the software product of a reference to memory and the length of this memory; and the software package (3) moves the segments into the subscriber's memory reference such that the resulting block of data matches verbatim the block of data that was initiated from the sending subscriber.

If the need arises to utilize one or more additional physical channels or eliminate one or more of the physical channels that are associated with an existing logical connection, the software package releases/connects these channels. The package preferably: (1) provides which physical channels must be released/connected; (2) waits for latest send request to be completed; (3) waits for latest receive step to be completed if any one or more segments has been received; (4) disconnects/-reconnects said channels; (5) adjusts pending send requests segmentation to match new number of available channels; and (6) restarts receives using new segmentation to match the new number of available channels.

The advantages accruing to the method and the subscriber station are numerous. For example, the method and station provide the ability to transfer large amounts of data from one end-user to another using preferably, such standard hardware products as an IBM or IBM compatible personal computer, an ISDN personal computer terminal adapter, an ISDN central office switch (i.e. NTI or AT&T 5ESS switch), and the ISDN.

By connecting two end-users using a number of combined ISDN 'B' channels, files can be transferred between the two utilizing the total bandwidth, less any protocol overhead, of these channels. At the same time, two-way messaging is available.

Voice features allow a person to initiate a call from a dialing directory. This directory can also be used to determine the source of incoming calls based on the number of the caller. Provided the PC Terminal Adapter supports a connection to a standard phone, ISDN-type phone features will be made available from the PC (hold, conference, transfer & drop). Voice features can be used simultaneously with data transferring and messaging as long as there is at least one 'B' channel available.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
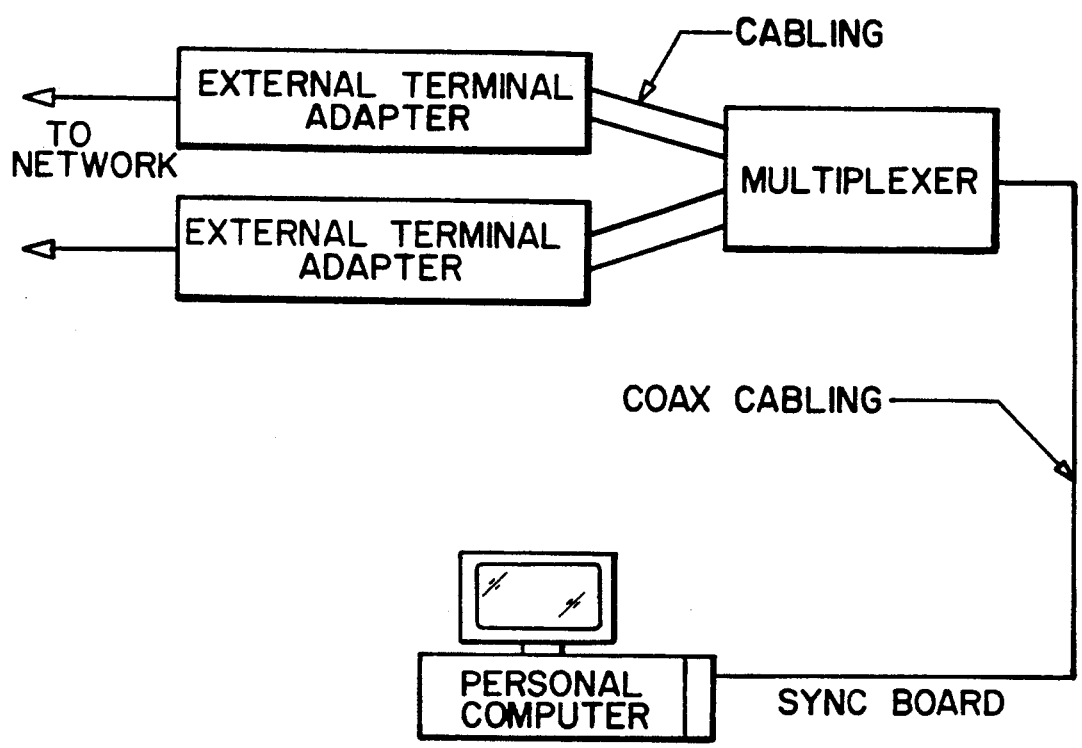
FIG. 1 is an illustration of a high speed data transfer (HSDT) system of the prior art.
Figure 2:
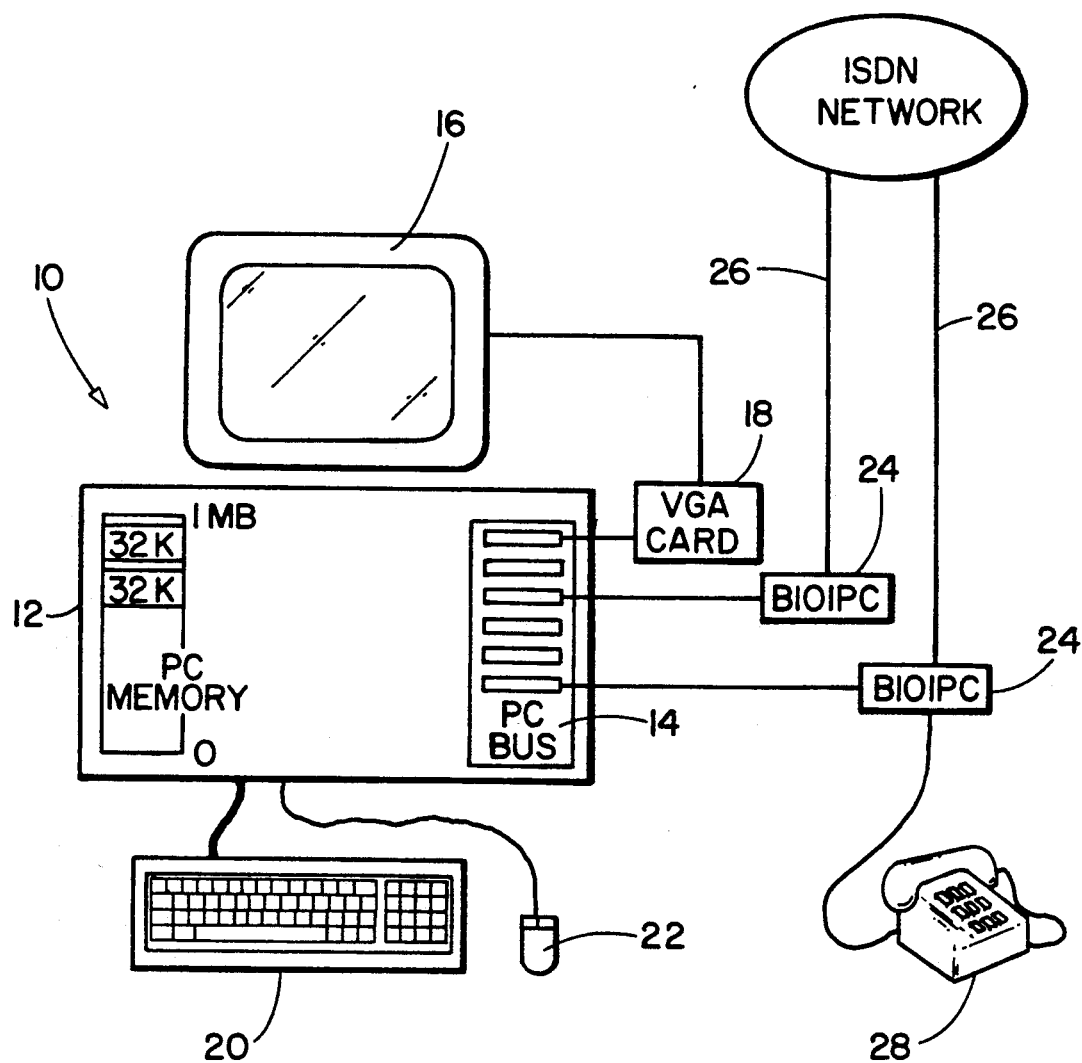
FIG. 2 is a detailed illustration of a subscriber station of the HSDT system hardware of the present invention.
Figure 3:
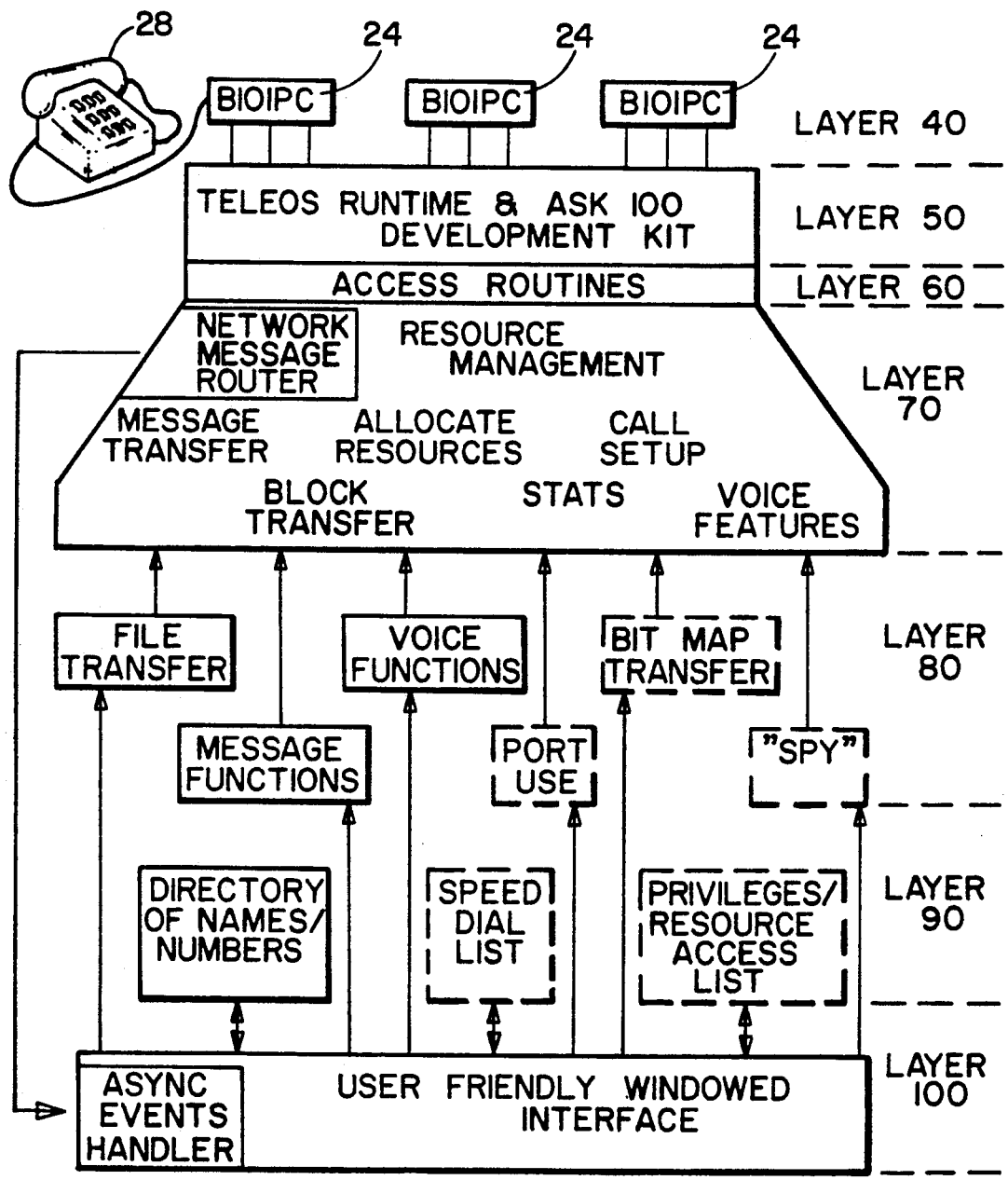
FIG. 3 is an illustration of the layers of the HSDT system software of the present invention and its interaction with the HSDT system hardware.

Referring now to FIGS. 2 and 3, an ISDN subscriber station 10 and the HSDT software package (as layers) are shown. In the preferred embodiment, the subscriber station 10 includes an IBM or an IBM compatible EISA- or ISA-bus personal computer 12 having an internal bus 14, a VGA color monitor 16 and VGA adapter card 18, a 101 key keyboard 20, a mouse 22 and an ISDN central office switch, such as the AT&T 5ESS switch (not specifically illustrated). The computer 12 preferably also has at least one ISDN personal computer terminal adapter, such as the Teleos B101PC Terminal Adapter (PCTA) 24, each connected to a Basic Rate Interface (BRI) ISDN line 26 and plugged into the internal bus 14. One of the PCTA's 24 has a standard telephone 28 attached thereto.

The PCTA 24 is an expansion card for an IBM or IBM compatible EISA- or ISA-bus computer. Each BRI line 26 consists of two 'B' channels and a 'D' channel. A 'B' channel is an ISDN path over which voice or data is transmitted. Data can be transmitted at up to 64 Kbps. A 'D' channel is an ISDN path through which the associated 'B' channels are controlled.

Figure 4:
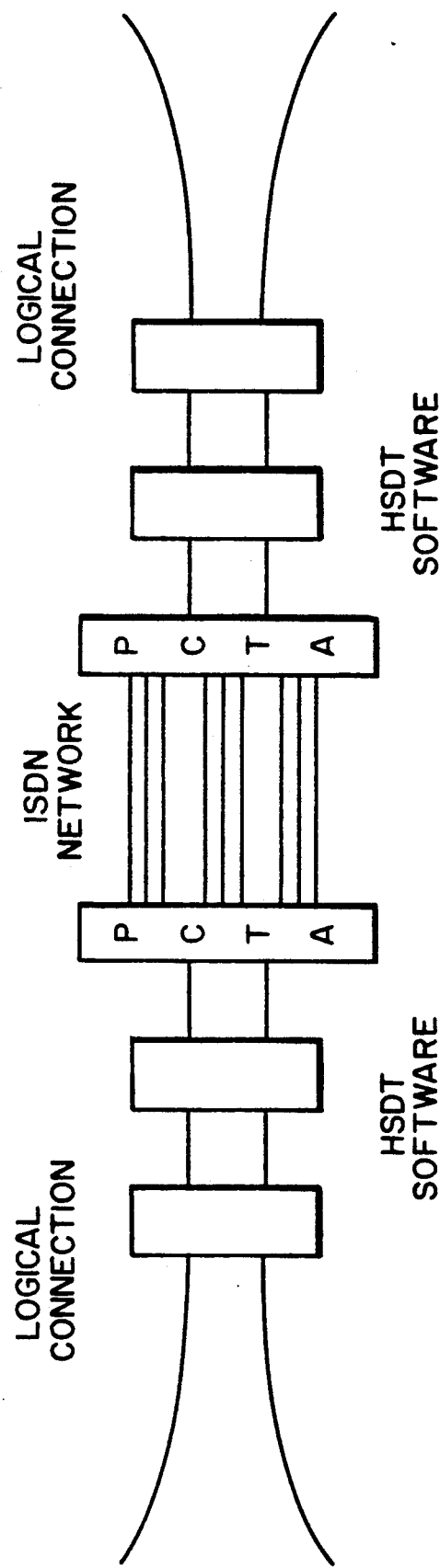
FIG. 4 is an illustration of the HSDT system of the present invention.

At the other end of the ISDN network, preferably, is a second subscriber station 12' (not specifically illustrated) having substantially the same hardware and utilizing the same HSDT software package. Subscriber station 12' may have a different number of PCTAs 24 than does subscriber station 12. Station 12 and station 12' can perform substantially the same function. A block diagram of the system, showing both ends of the network, is shown in FIG. 4.

It should be noted that in order to have communication between the subscriber stations 12 and 12' running the HSDT software, there must be enough ISDN BRI lines 26 available to support each PCTA 24 in each computer 12.

Additionally, since the HSDT software performs the transfer of large amounts of information, the computer 12 is preferably equipped with a hard disk 30 (not specifically shown). This disk 30 must be large enough to store all files being sent or received, as well as all software necessary for the program to run (DOS, Microsoft Windows, Teleos run-time). The data transfer rate of the disk must be sufficient to support the maximum possible ISDN bandwidth that may be utilized for data transfer.

Since the computer 12 must be capable of transferring data over the bus 14 quickly enough so as to not impact overall performance, the computer 12 is preferably based on a microprocessor having a bus speed of at least 8 MHz, such as the Intel 80286, 80386 or 80486.

The HSDT software was developed using Microsoft 'C' version 6.0, Microsoft Windows version 3.0, Microsoft Windows 3.0 Software Development Kit and the Teleos ASK 100 development kit, all commercially available. In the preferred embodiment, the subscriber station 12 will run under IBM PC-DOS version 3.3 (or any MS/PC-DOS version 3.0 or greater) and Microsoft Windows version 3.0. The execution environment will require the Teleos runtime API routines supplied with each Teleos B101PC card.

Although the HSDT software utilizes the Microsoft Windows environment, future applications that utilize the invention are not restricted as to what environment they may run under. This will make access to the capabilities of the software simple and easy to use, and be more appealing to potential customers.

Referring now to FIG. 3, the HSDT software and its interaction with the subscriber station 12 are illustrated by layer. The layered approach was utilized to allow for maximum reusability. The following layers comprise the HSDT software:

Layer 40—Subscriber Station 10 Hardware
Layer 50—Vendor Applications Program Interface (API)
Layer 60—Vendor specific code
Layer 70—Resource Management Layer
Layer 80—Service Layer
Layer 90—HSDT Databases
Layer 100—User interface It should be appreciated that use of a layered approach permits another vendor's ISDN cards to be used in the final product. This is achieved by isolating the vendor-specific calls to the vendor-specific code layer 60, which makes each ISDN source available.

Other benefits of a layered approach include the availability of various "services" (such as voice capabilities, file transfer, and messaging) that are independent of the hardware configuration of the computer 12. Thus, there is an isolation between the service layer 80 and the resource management layer 70. Furthermore, the service layer 80 implements each ISDN service without any reference to a user interface, allowing for the addition of other services that are not defined at this time. In FIG. 4, the boxes in dashed lines represent such future services/features. Additionally, applications that make use of these services may run under a number of user interface environments.

The layered approach also isolates the developer of a new application from ISDN internals as much as possible, since the developer should only be required to have a general knowledge of ISDN.

In the preferred embodiment, the HSDT software is comprised of a single executable program and a number of supporting data files. It is developed to run on an Intel microprocessor-based personal computer and is designed to transfer data at much higher speeds than is typically possible by making use of the capabilities of ISDN. This high speed transfer is accomplished by linking and synchronizing multiple 'B' channels of BRI lines 26 to achieve a higher bandwidth, as described in greater detail herein below.

The User Interface

The user interface runs under the Microsoft Windows version 3.0, presenting a single, consistent user interface to multiple products. It will operate similar to other communications software currently available, thus making the software easier to use. The interface is designed to assure uniformity in appearance and consistency in operation with other existing applications that make use of this environment.

As a part of the user-friendly windowed interface, at various times throughout the course of a session with the software, the user will enter information, and other information will be displayed to the user. This is accomplished through the use of windows. Generally, there are individual windows for each situation confronting the user.

Events can be initiated by either the user or the network. If allowed, the appropriate window for the activity is displayed, and that event is initiated or responded to in this window.

Figure 5:
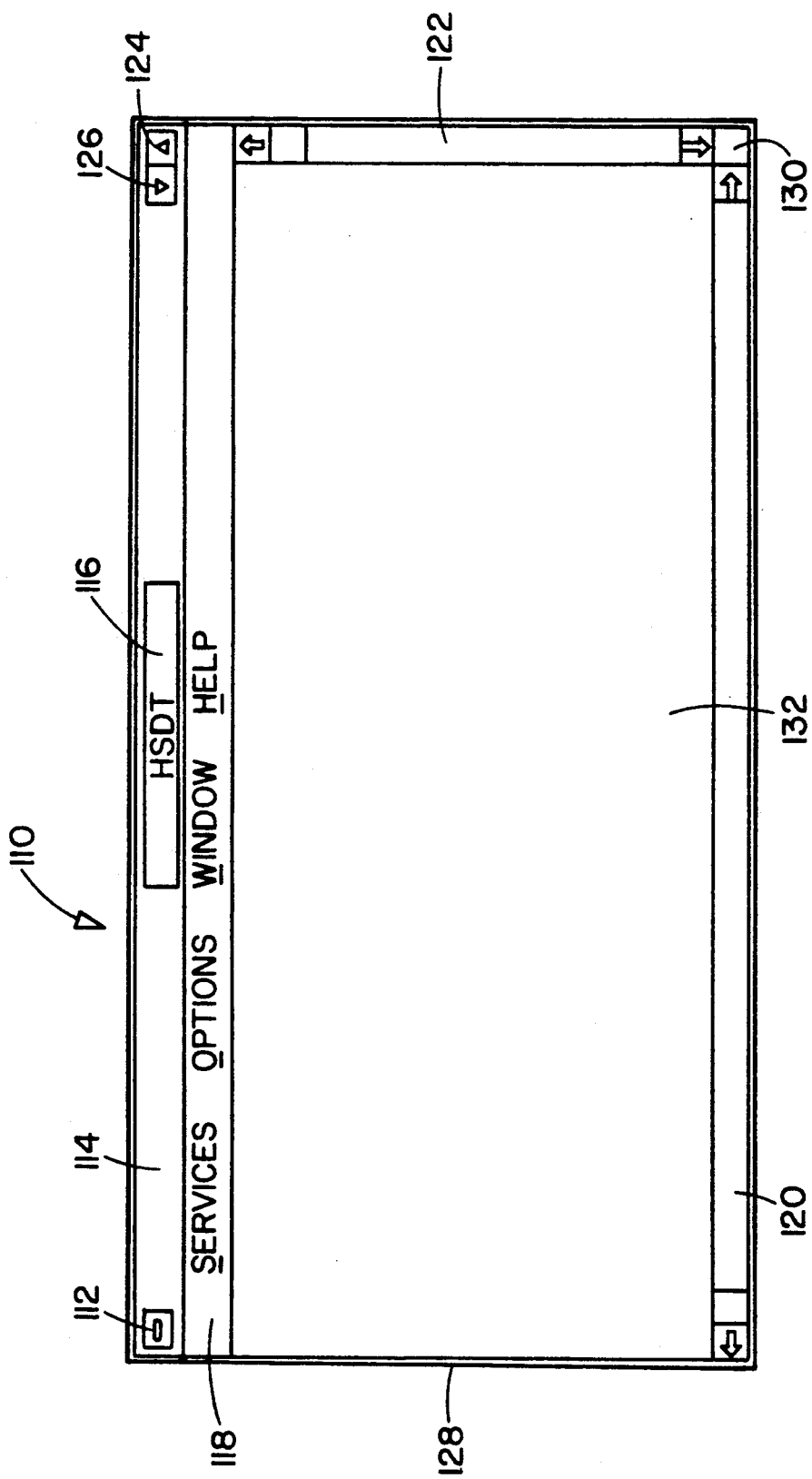
FIG. 5 is an illustration of the main window of the user-interface of the present invention.

Referring now to FIG. 5, a sample window 110 is illustrated. The Control-menu box 112 is located in the upper-left corner of each window. The Control-menu (also called the System menu) is most useful if you prefer to use the keyboard 20. With Control-menu commands, you can resize, move, maximize, minimize, and close windows, and switch to Task List. (If you are using the mouse 22, you can move, resize, minimize, maximize, and close windows simply by clicking and dragging).

The Title bar 114 shows the name of the particular application. If more than one window is open, the title bar for the active window (the one in which you are working) is a different color or intensity than other title bars. The title bar contains the window title 116.

The menu bar 118 lists the available menus. Most applications have a File menu, an Edit menu, and a Help menu. The HSDT software has these menus as well as additional ones, as described in greater detail herein below.

Horizontal scroll bar 120 and vertical scroll bar 122 let the user move portions of the window 110 into view that are not currently shown. They are used when there is too much information in a window to all be seen at once. They also let the user view unseen portions of lists and other information that is too long to fit in the allotted space.

The Maximize button 124 and the Minimize button 126 (chosen with the mouse 22) enlarge the HSDT window to fill the entire screen or shrink the window to an icon. After the user enlarges the window 110, the Maximize button 124 changes to a Restore button not specifically illustrated. The Restore button is used to return the window to its previous size.

The window border 128 represents the outside edge of the window 110. The user can lengthen or shorten each side of a border if the window has the ability to change size. The window corner 130 can be used to shorten or lengthen two sides of a border at the same time.

The workspace 132 is where most of the work is done. This is where other windows and information are displayed. An arrow-shaped mouse-pointer (not specifically shown) appears if the user has the mouse 22 installed.

The HSDT icon (not specifically illustrated) will appear after the user starts the program and chooses the Minimize command. HSDT will shrink from window size to its icon and continue to run minimized at the bottom edge of the screen. This and other application icons are the only icons that appear on the screen outside the window borders.

Generally, these icons can be moved anywhere on the screen, but not into an open window. Even though Windows will let the user physically place an application icon in an open window, the icon is actually still occupying space on the screen. If the user moves the window, the application icon does not move with it, and if the user closes the window, the application icon remains on the screen.

Another type of icon is called a Document icon. These icons (not specifically shown) appear at the bottom of the application window and can be moved anywhere within the workspace 132, but not outside its borders.

In the preferred embodiment, there are three types of document icons: Call Window icons, File Transfer Windows icons and Chat Window icons. Call Window icons represent a connection, which may be a new call, an incoming call or an established call. The File Transfer Window icons represent any file transfer in progress for a connection, either sending or receiving a file. The Chat Window icons represent a chat session on a connection.

Working with Menus

All user-accessible commands in the HSDT software are listed in menus. The Control Menu opens from the control-menu box 112 in the upper-left corner of each window. Other menus are listed by names in the Menu bar 118 at the top of the HSDT window 110.

To Select a Menu

Point to the name of the menu bar and click the name to open the menu. (Drag the selection cursor down the menu to move to a menu item immediately), or Press ALT (or F10) to select the menu bar 118. Then press the LEFT ARROW or RIGHT ARROW to select the desired menu. (Using the DIRECTION keys also select the control menu box for the application and the advice document window). Then press ENTER to open the selected menu.

Hint: If the menu names have underlined letters, move to the menu bar, select a menu, and open it with one step. Press ALT, and then press the underlines letter. If more than one menu name has the same underlined letter, Windows selects the first name listed. Press ALT, then the letter again to select the next menu.

To Cancel a Menu

Click the menu name, or anywhere outside the menu, with the mouse 22, or

Press ALT (or F10) to cancel the menu and move back to the workspace 132, or

Press ESC to cancel the menu but remain on the menu bar 118 so that you can select another menu.

Once a menu is selected, an item from it may be chosen by:
Clicking the item name, or
Typing the underlined letter in the item name, or
Using the UP and DOWN ARROW keys to select the desired item; then press ENTER.

All Windows applications follow certain conventions when listing items on a menu. Some menu items may appear dimmed, some may have check marks (√) next to them, some may have ellipses (...) after their names, and some may have key combinations listed across from them. These conventions signal that extra information about the menu commands as follows.

| Menu Convention | What it means |
| --- | --- |
| Dimmed command name | The command is not available at this time. You might have to select something before you can use the command, or it might be that the command cannot be used with your application. |
| An ellipsis (...) after the name | A dialog box will appear when the command is chosen, asking for information the application needs to carry out the command. |
| A checkmark ( ) next to the name | The command is active. This convention is used for commands that toggle between one state and another. |
| A key combination after the name | The key combination shown is a shortcut for this command. Use this key combination to choose the menu command without first opening the menu. |
| A triangle (Δ) at the right side of a menu command | The command leads to a cascading menu, which lists additional commands that are available. |

Within the HSDT software, the main window, an icon, some child windows, and some dialog boxes all have a Control Menu. How the Control Menu is opened depends on whether it is associated with the main window, a child window, a dialog box, or an icon.

To open the Control menu for the main window or an icon:
Click the control-menu box 112 in the upper-left corner of the window or click the icon with the mouse 22, or
Press ALT+ESC repeatedly to cycle through the open application windows and icons, then press ALT+SPACEBAR to open the desired Control menu.

To open the Control menu for child windows or child icons:
Click the control-menu box 112 in the child window or click the child icon with the mouse, or
Press CTRL+F6 (or CTRL+TAB) repeatedly to cycle through open child windows or icons, then press ALT+HYPHEN (−) to open the desired Control menu.

To open the Control menu for a dialog box:
Click the Control menu box in the dialog box, or
Press ALT, SPACEBAR.

The Control Menu pull-down actions include:
Restore returns the window to the size it was and the position it was in prior to a Maximize or Minimize action.
Move allows users to reposition a window on the screen.
Size allows users to change the dimensions of a window.
Minimize removes from the screen all windows associated with HSDT and places HSDT's icon on the screen. Usually this icon is displayed in the lower part of the screen. Users can move minimized icons.
Maximize enlarges the window to the largest possible size, the size of the screen.
Close removes the window and all associated windows from the screen. Close is equivalent to Exit in windows and to Cancel in dialog and message boxes.

Switch to . . . causes the appearance of a dialog box that contains a list of the active applications.

Working With Dialog Boxes

Microsoft Windows uses dialog boxes to prompt information from the user and provide information to the user. Whenever there are ellipses ( . . . ) after a menu command, a dialog box for that command follows. Windows also uses dialog boxes to display additional information and warnings, or to explain why a requested action could not be accomplished.

Most dialog boxes contain options, each one asking for a different kind of information. After all the requested information is supplied, a command button is chosen to carry out the command. Dialog boxes that have title bars can be moved around on the screen like windows, as described herein below in greater detail.

Often the need arises to move around within a dialog box to make several selections. The current option is marked by a highlight or dotted rectangle (or both) around the name of the option or button.

To move within a dialog box:
 Click the option or group you want to move to with the mouse 22, or
 Press TAB to move forward (generally from left to right and top to bottom) or SHIFT+TAB (to move in the opposite direction), or
 While holding down the ALT key, type the underlined letter in the option name or group, or
 Within a group of options, use the DIRECTION keys to move from one option to another.

Command buttons initiate an immediate action. One command button in each dialog box carries out the command the user selects, using information supplied in the dialog box. Other command buttons let you cancel the command or choose from additional options.

Command buttons marked with an ellipsis ( . . . ) open another dialog box for entry of more information. Command buttons marked with a pair of greater-than symbols (> >) expand the current dialog box.

Buttons that are unavailable are dimmed. The currently selected, or default, button has a darker border than the other buttons. The selected button can be chosen by pressing ENTER. The dialog box can be closed prior to completion of a command by choosing Cancel.

To choose a command button:
 Click the command button with the mouse 22, or
 Press TAB to move to the desired command button. A dotted rectangle around the button text marks the selected button. Then press the SPACEBAR (or ENTER) to choose the button and complete the command.
 Hint: If the button has an underlined letter in its name, the command can be chosen in one step. Hold down ALT and press the underlined letter.

A text box is a rectangular dialog box into which information is typed. When moving to an empty text box, an insertion point (flashing vertical bar) appears at the far left side of the box. The text typed starts at the insertion point.

If the box already contains text, all the text in the box is automatically selected and any text typed replaces it. Or, the existing text can be erased by pressing DELETE or BACKSPACE.

To select text in a text box:
 Drag the pointer across the text to be selected. Or, double-click to select one word at a time, or
 Use the DIRECTION keys to move to the first character to select in the box. Then hold down SHIFT and press a DIRECTION key to extend the selection. (Press SHIFT+HOME to extend the selection to the first character in the box. Press SHIFT+END to extend the selection to the last character in the box).

A list box is a dialog box which shows a column of available choices. If there are more choices than can fit in the list box, scroll bars are provided so that the mouse 22 can be moved up and down quickly through the list.

To select an item from a list box:
 Click the scroll arrows until the choice appears in the list box. Then click the item to select and then choose the command button. Or, double-click the item to choose it and complete the command, or
 Use the DIRECTION keys to scroll to the item. Or, type the first letter of the item. Microsoft Windows move the highlight to the first item that starts with that letter. Press ENTER to choose the item and complete the selected command.

Option buttons appear in dialog boxes as a list of mutually exclusive items. Only one option can be selected from the list at a time. A selection can be changed by selecting a different button. The selected option button contains a black dot. Unavailable options are dimmed.

To select an option button:
 Click the option button with the mouse 22, or
 Press TAB to move to the desired option group. Then use the DIRECTION keys to select the option button.
 Hint: If the option name contains an underlined letter, hold down ALT and press the underlined letter from anywhere in the dialog box to select an option button.

Check boxes are dialog boxes that offer a list of options that can be switched on and off. Any number of check box options can be selected. When an option in a check box is selected, it contains an X. Otherwise, the box is empty. Names of options that are temporarily unavailable are dimmed.

To select or clear check box options:
 Click each empty check box to make a selection, or click a selected box to clear the selection, or
 Press TAB to move to the desired empty check box. Press the SPACEBAR to enter an X. Press the SPACEBAR again to clear the selection.
 Hint: If the check-box name has an underlined letter, hold down ALT and press the underlined letter for each check box to select or clear.

When a command button has been chosen, the dialog box closes and the command takes effect. To close a dialog box without completing the command:
 Choose Cancel, or
 Double-click on the System menu box, or
 Press ESC.

For dialog boxes that do not have Cancel buttons, choose the Close command (press ALT+F4) from the System menu. For dialog boxes that do not have Cancel buttons or System menus, choose the appropriate button.

Working with a Window

When working with the HSDT software, a number of different windows will usually be open. Some methods of organization are listed herein below. The Microsoft Windows User's Guide provides additional detail.

> Move application windows, document windows, and icons to different places on the screen. Move any dialog box that has a title bar.
>
> Change the size and shape of most windows on the screen. If using a mouse 22, drag each side of the window border or its corners to adjust its size. If using the keyboard 20, the commands on the System menu allow the window's size and shape to be modified.
>
> Shrink a window to an icon when finished working with an application or document window, although still available for later use. When an application window is shrunk to an icon, the application is still running in memory, but its window is not taking up space on the screen.
>
> Select and move icons on the screen in the same way windows are selected and moved. Double-click the icon to restore the window (or use the Maximize or Restore commands on the System menu).
>
> Enlarge the windows to fill a larger portion of the desktop or even the entire desktop.
>
> Restore an icon or a window. The Restore command returns a window or an icon to the size and position it occupied before it was enlarged or shrank to an icon.
>
> Some windows and dialog boxes have scroll bars to view text that requires more than the available space.
>
> When working with an application window, one way to exit from the application is to close the window. Similarly, when working with a document window, exit from that document by closing the window.

Working with HSDT

In the preferred embodiment, there are two methods of starting the HSDT from the Program Manager. The first is to choose the HSDT item from a group window. Alternatively, the user can select the Run command from the File menu. The user, however, must type the complete pathname to HSDT including its name and extension.

In order to make the HSDT software user-friendly, the user interface was designed:

1) To present the user with an interface that is consistent across all applications that run under the Microsoft Windows environment. This aids users in learning new applications more quickly and easily.
2) To make the interface simple to use. The user should not have to bother with the mechanics of the interface that make the application work. They should instead be able to concentrate on accomplishing their tasks.
3) To make the interface natural. The operation of the program should be intuitive so the user can anticipate what to do at each step.
4) To allow the user to control the dialog. When the user is in control, they can switch from one activity to another, change their ends easily, and stop activities they no longer want to continue. Users should be able to cancel or suspend any time-consuming activity without causing disastrous results.
5) To make the interface forgiving. User actions should be easily reversed. They should be able to explore without fear of causing an irreversible mistake. Destructive actions (that may cause the unexpected loss of the user's information) should require a confirmation.
6) To provide immediate feedback. Users should never press a key or select an action without receiving immediate visual feedback, audible feedback, or both.

Most of the features of the HSDT software are accessed from menus. These menus are located at the top of the main window on the menu bar 118. They can be accessed with either the mouse 22 or from the keyboard 20. Each menu, its description, and the functions it contains follows (each menu is not specifically illustrated for the sake of clarity):

The Services Menu provides the user with service oriented functions. The Services Menu pull-down actions include:

> Setup Call allows the user to establish a new connection.
>
> Send File allows the user to send a file over an established connection.
>
> Send Message allows the user to send a message over an established connection.
>
> Chat Session allows the user to chat over a connection.
>
> ISDN Phone allows the user to place a voice call.
>
> Exit allows the user to exit the HSDT application.

The Options Menu provides a means for users to customize the HSDT software. The Options Menu pull-down actions include:

> Auto Answer allows other applications to connect to this one without requiring any user action.
>
> Auto Receive allows other applications to send files to this one without requiring any user action.
>
> Return Receipt enables the user to receive a confirmation that a message sent to another workstation was received.
>
> Refuse Messages provides the user with the choice of refusing to receive any messages sent from other workstations. If this option is selected and another user tries to send a message, the other user will receive a message that messages are not being accepted.
>
> Refuse Chat provides the user the choice of refusing any chat sessions requested from another workstation. If this option is selected and the other user attempts to "chat", the other user will receive a message that chat sessions are not being accepted.

The Window Menu provides a means for users to customize the HSDT application. The Window Menu pull-down actions are:

> Cascade will move and resize all open HSDT windows such that the title bars of all of them are visible.
>
> Title will move and resize all open HSDT windows such that none of them overlap.
>
> Arrange Icons will move all minimized HSDT document icons and align them along the bottom of the HSDT communications window.

Below these menu items will be a listing of all HSDT document windows, whether they are open or iconized (i.e. minimized). The currently active window will have a check mark next to it. From this menu, the user can move to any HSDT window.

The Help Menu allows users to access the on-line help system built into Windows, as well as getting information about HSDT. The Help Menu pull-down actions include:

Help on Help allows the user to get help on using the Help system.

Index accesses the on-line help system and gives the user an index of all available topics relating to HSDT.

About HSDT gives brief information about the HSDT application.

The Control Menu is available in the title bar 114 of all windows in HSDT to provide keyboard access to all actions that users can perform on a window, such as moving and sizing.

Accessing and Using Help

Help with the HSDT software is provided by using the Help facility that is provided with Microsoft Windows. It is in reality a separate program, but to the user, it appears to be part of the software they are running.

It should be noted that the purpose of Help is to provide the user with additional information about HSDT. It is not meant to tutor users. Tutorials teach new users how to use an application; help information should help users recall how to use an application. A tutorial is not provided with HSDT, only a Help reference. If the user is unfamiliar with the Help system, Help on Help may be chosen for assistance.

Task Specification

The following describes in detail each task that can be accomplished by the HSDT software when transferring data.

Establishing a Logical Connection

This command will only be available if there is at least one available 'B' channel. Before any data can be sent or received by the first subscriber station 12 utilizing HSDT, a logical connection must be established with another subscriber station 12'. This connection is made by choosing the Setup Call command from the Services menu.

Figure 6A:
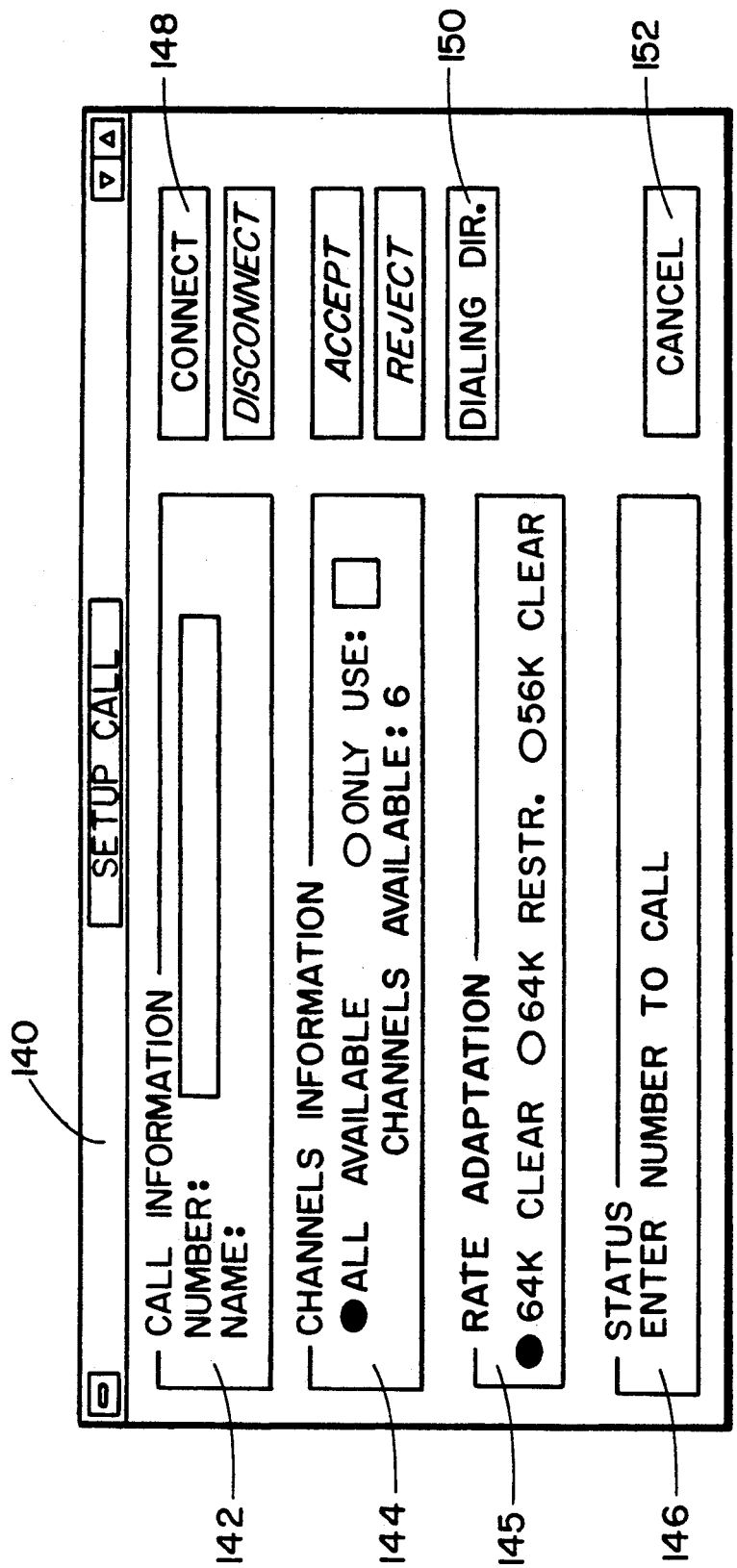
FIG. 6a is an illustration of the Setup Call Window.

When this command is chosen, the user is presented with a Setup Call Window 140, a new connection window containing connection information, as illustrated in FIG. 6a. At the top of the window 140 is a Call Information Box 142, which contains the number to be called and the name associated with the number to be called. These are to be supplied by the user either by typing the number in the number field or by choosing an entry from the Dialing Directory, as described in greater detail below.

Below this box is a Channel Information Box 144, which contains usage information to be set by the user. The user can select to use either all available B channels by selecting the All Available button or only some of the available channels by selecting the Only Use button and entering the exact number of channels to use in the adjacent field.

Below the Channel Information Box 144 is the Rate Adaptation Box 145, where the user can specify the rate at which the data transfer will occur. Preferably, the user can select from 64 Kbps clear, 64 Kbps restricted or 56 Kbps clear. As is known, some transmission lines utilize one or more bits, depending on the amount of data transferred, to effect proper transmission. For example, the line may use one bit for every 3 bytes transferred. Such a transmission line is generally termed "restricted", while one that does not utilized any bits is generally termed "clear".

Below the Channel Information Box 144 is the Status Box 146 where status messages relating to the connection are displayed to the user. To the right of the boxes 142 through 146 are a plurality of buttons, the names of which appear in normal text or italicized text. The buttons appearing with normal text can be selected by the user. Thus, when the Setup Call Window 140 is displayed to the user, only the Connect button 148, the Dialing Dir. button 150 or the Cancel button 152 may be selected by the user.

Selecting the Connect button 148 results in the software attempting to place a call. If the connection is established, the title of the window will change from "Call New" to include the number connected thereto.

After selecting the connect button 148, the HSDT software package preferably performs the following steps to establish the single logical connection: (1) matches each given rate adaptation with an available 'B' channel; (2) sends the rate adaptation list to the subscriber station 12' (remote process) using the given phone number (or ISDN address), and phone number to dial back; (3) the subscriber station 12' delivers this list to the user of the software; (4) the user may modify the rate adaptations and/or eliminate some, and presents this list back to the HSDT software package; (5) matches this new list to available compatible channels; (6) sends back the modified list along with phone numbers for each 'B' channel; (7) each 'B' channel is dialed up in order to make the physical connection using the new rate adaptation list; and (8) once all the 'B' channels in the list are established as physical connections an exchange of information is made to synchronize the channels and the subscriber station 12 is given a 'handle' on this one logic connection.

Selecting the Dialing Dir. button 150 will result in the dialing directory being accessed, as described in greater detail below. The user may exit this window by selecting either the Cancel button 152 or Close from the window's Control menu. Additionally, the Setup Call Window 140 may be minimized at any time.

Selecting a Dialing Directory Entry

This command is available from the Setup Call Window 140. As noted above, when a user wishes to choose a number from the directory, the Dialing Dir. button 150 must be selected.

Figure 6B:
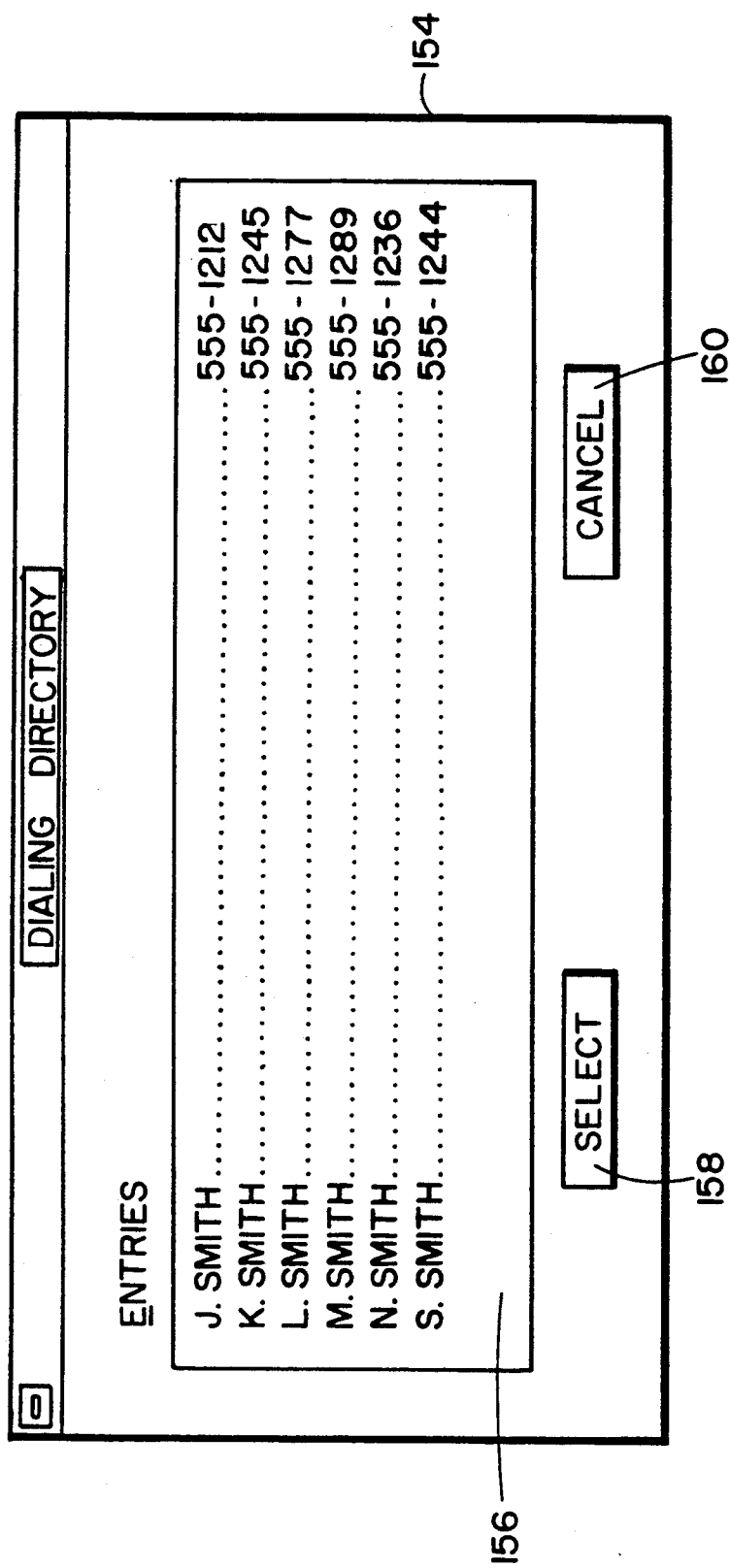
FIG. 6b is an illustration of the Dialing Directory Window.

As best shown in FIG. 6b, the user is presented with the Dialing Directory Dialog Box 154 to select an entry when the Dialing Dir. button 150 is selected. The entries field 156 contains all available entries. The entries field 156 is scrollable, such that a scroll bar (not specifically illustrated) will appear on the right edge of the box to allow the user to view more entries.

The user moves the selection bar with the up/down arrow keys or mouse, thereby highlighting an entry. Additionally, the user may simply type a letter and the selection bar will automatically move to the next name beginning with that letter.

Choosing the Select button 158 will close the box 154 and the user will be returned to the Setup Call Window 140. The name and number selected will appear in the Call Information Box 142. Selecting the Cancel button 160 will similarly close the box 154 and the user will be returned to the Setup Call Window 140, but the name and number fields in the Call Information Box 142 will not be altered.

Terminating A Connection

Figure 7:
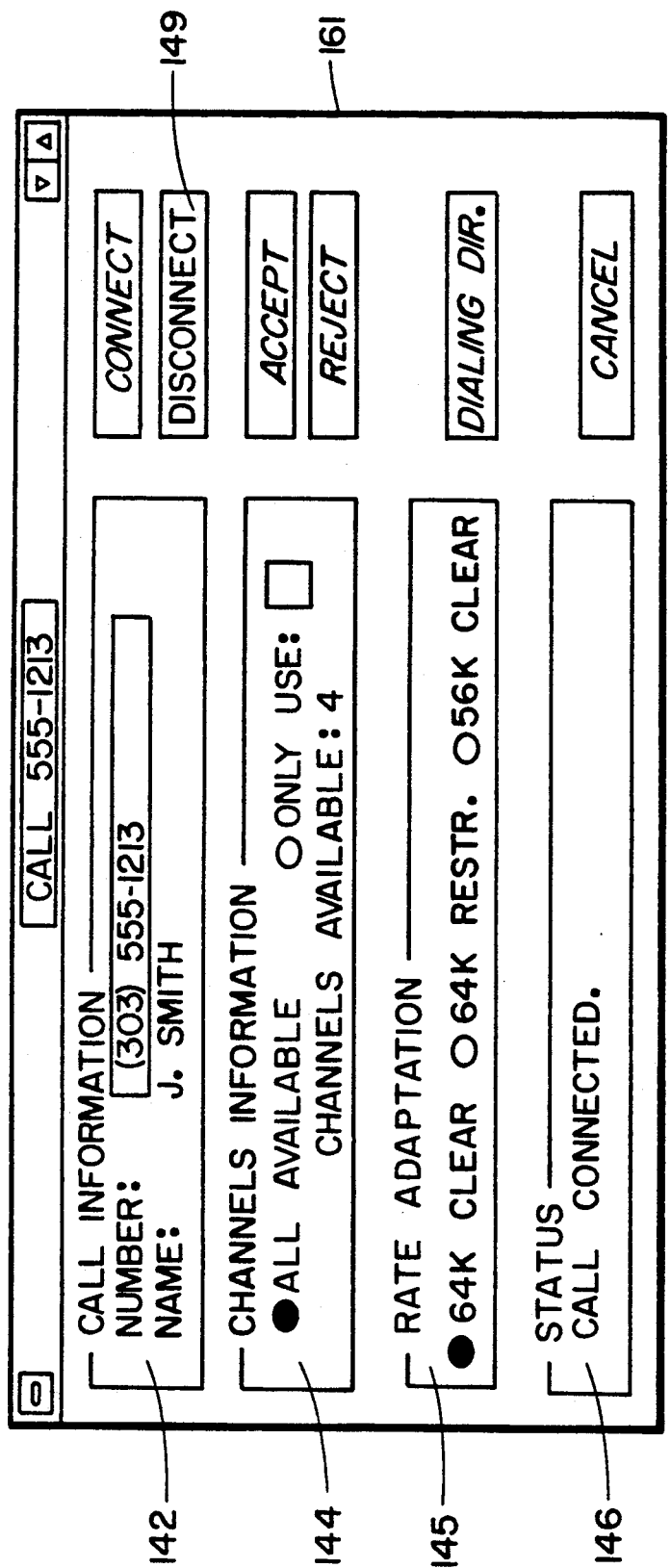
FIG. 7 is an illustration of the Disconnect Call Window.

This command will only be available if at least one logical connection exists. When a user no longer desires to be connected to another system, a connection can be terminated utilizing the Disconnect Call Window 161 shown in FIG. 7. It should be noted that the Disconnect Call window 161 is substantially the same as the Setup Call Window 140, except that disconnect button 149 is the only button that appears as normal text (i.e. can be selected) to the user.

When a data connection is established, the title of the Call window reflects the number connected to (or the name if the number is listed in the Dialing Directory), and information about the connection is displayed in the Call Information Box 142, the Channel Information Box 144 and the Status Box 146.

If the window 161 is displayed, the user may select the Disconnect button 149 or select Close from the window's Control Menu. If the window is an icon, the user can still disconnect by highlighting the icon and selecting Close from the Control Menu.

Choosing the Disconnect button 149 or selecting Close from the Control Menu will result in the connection being terminated and the Call window disappearing. Also, the window will be removed from the list under the Window menu. If for some reason the connection could not be terminated, a message box will appear informing the user.

Instead of a complete disconnection, the need may arise to add or eliminate one or more of the physical 'B' channels that are associated with an existing logical connection. It should be appreciated that the HSDT software package could preferably release/connect these channels by (1) providing to the user which physical channels must be released/connected; (2) waiting for the latest send request to be completed; (3) waiting for the latest receive step to be completed if any one or more segments has been received; (4) disconnecting-/reconnecting and relinking said channels; (5) adjusting pending send requests data segmentation to match the new number of available channels; and (6) restarting receives using the new segmentation to match the new number of available channels.

Handling An Incoming Connection Request

The first subscriber station 12 may connect to a request from a second subscriber station 12' only if there is at least one available 'B' channel to support the request. Thus, if all 'B' channels of subscriber station 12 are utilized and the subscriber station 12' requests a connection to the station 12, a 'B' channel must be made available before the subscriber station 12 can connect to the request.

Figure 8:
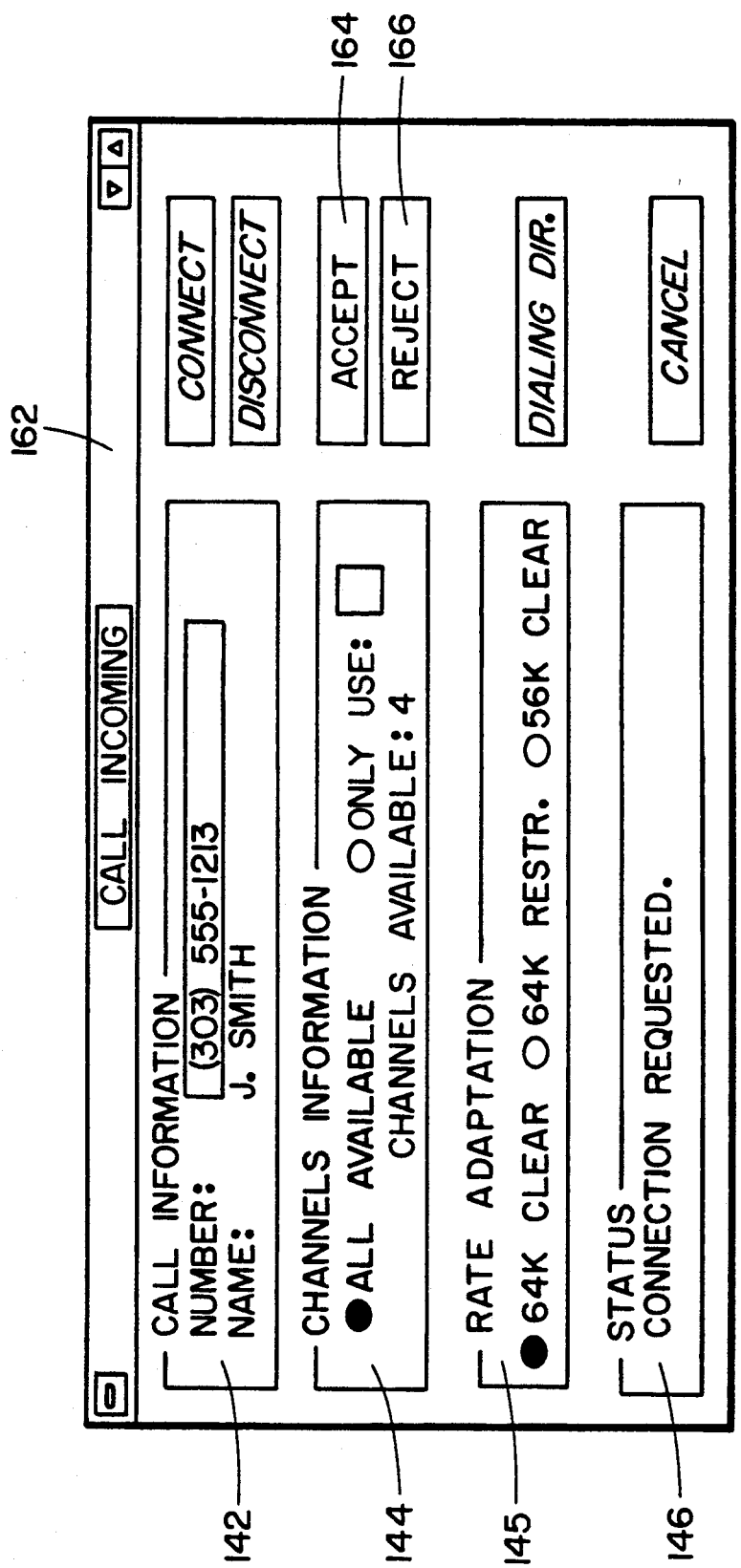
FIG. 8 is an illustration of the Incoming Call Window.

Before any data can be sent or received by HSDT, a logical connection must be established as described above with the subscriber station 12'. This connection may be initiated by another user. When a request for a connection comes in from the network, the Incoming Call Window 162, as shown in FIG. 8, will appear. While the window can be minimized, the user should respond to any request as quickly as possible.

It should be appreciated that this command cannot be accessed from the menu. It should be noted that the Incoming Call window 162 is substantially the same as the Setup Call Window 140 and the Disconnect Call Window 161. When the Incoming Call Window 162 is displayed, however, only the Accept button 164 and the Reject button 166 appear as normal text to the user.

The Incoming Call Window 162 contains information about the request and fields to modify the connection parameters. As noted above, the Call Information Box 142 contains the number of the caller and the name associated therewith, if one can be found. The Channels Information Box 144 contains channel usage information, which is modifiable by the user before accepting the call. The Status Box 146 contains messages relating to the connection.

The number of 'B' channels to use can be set from the Channels Information Box 144. The user can select to use either the number of 'B' channels requested by the sending subscriber station 12' by making no modifications, or the user can select only some of the available channels by selecting "Only Use" and entering an appropriate number. Thus, the user may establish a connection at a lower bandwidth than that requested. In the preferred embodiment, a higher bandwidth than that requested can not be established, although establishing a higher bandwidth than that requested is possible.

By selecting the Accept button 164, the program accepts the call with the parameters selected. If the connection is established, the title of the window will change to include the number (or name if the number is listed in the Dialing Directory) connected thereto. If the Reject button 166 is selected, a reject message will be sent to the subscriber station 12' and the window 162 will be closed.

Selecting a File to Send

Figure 9:
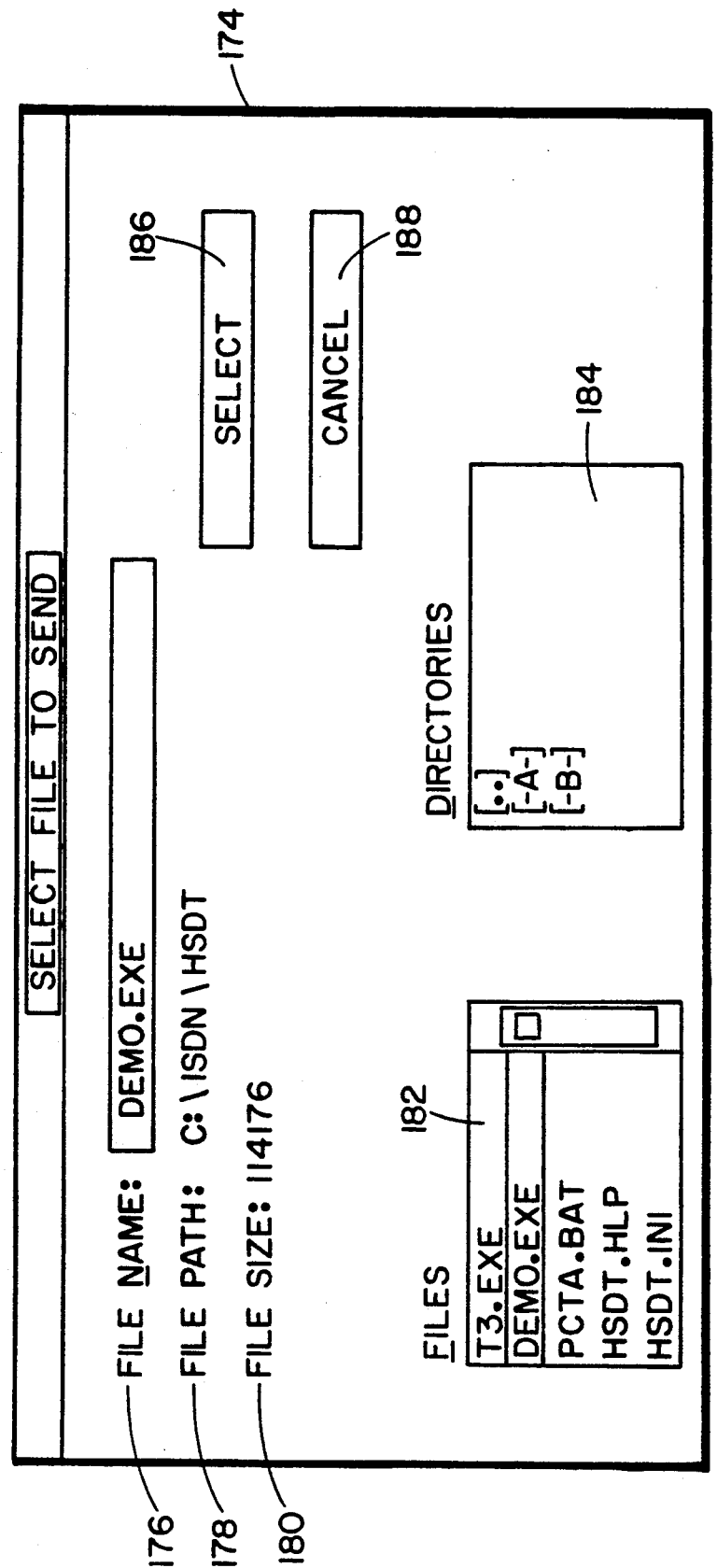
FIG. 9 is an illustration of the Select File to Send Window.

This command will only be available if at least one logical connection exists. When a user wishes to send a file (e.g. to the subscriber station 12'), a file to send must be selected. This is done by choosing the Send File command from the File menu. When this command is chosen, the user is presented with the Select File to Send Window 174, as shown in FIG. 9. The Select File Window 174 allows the user to select a file to transfer. At the top of the box 174 there will be several fields containing information on the currently selected file. These include the file name field 176, path field 178, and the size field 180. Below these fields are two list boxes. The Files box 182 contains a list of all files in the current directory for the user to choose from. The Directories box 184 contains a list of all subdirectories of the current directory, the parent directory of the current directory, and a list of all other available drives. Above and to the right of the Directories list box 184 are the Select button 186 and the Cancel button 188.

Preferably, the user selects a file to send by selecting a file from the Files list box 182, a static display field. Of course, the file name field 176, an edit field, could be utilized, wherein the user would type in a file name. The user can change directories or drives by choosing entries from the Directories list box 184.

Choosing the Select button 186 with a file selected or double-clicking on the filename to send will close the window and the software package will allow the data to be sent over the logical connection by: (1) reading the file from the hard disk; (2) providing a reference in memory to the contiguous block of data to be sent; and (3) the length of data to send. It should be noted that the file is read from the disk in "pieces" or "blocks", and that steps (2) and (3) are performed for each "block." The Send File Window discussed in greater detail below, will be displayed during the transfer.

In preparing to send data, the HSDT software package breaks the data up into segments of varying length, one for each 'B' channel in use. The length is proportional to each channel's data rate.

In the preferred embodiment, a request is first made to send a block of data (e.g. send "ABCDEFGHIJKLMNOPQRSTUVWX"). Next, the block is "segmented", or copied in pieces proportional to the bandwidth of the 'B' channels available, as separate blocks of data, one for each channel (e.g. the block may be segmented as "ABCDEFGHIJKLMNOPQR", "STU" and "VWX" for transfer over an "HO" and two (2) 'B' channels, respectively). A request is then made to the PCTA 24 for each 'B' channel to transmit a block of data over the network. After the data is transferred over the network, the segmented data is regrouped back to the original block (e.g."ABCDEFGHIJKLMNOPQRSTUVWX"). A message that the file transfer is complete is then provided to the sending user. It should be appreciated that buffering with a cache memory or the like could be employed to facilitate the data segmentation and transfer.

Since each user can not guarantee which of their available 'B' channels will be utilized for the transfer, the HSDT software performs an information exchange between the subscriber stations 12 and 12' to synchronize the channels. The synchronization, which occurs at the time the logical connection is made, operates to match 'B' channels on opposite sides of the network (e.g. the first 'B' channel of station 12 is matched to the first 'B' channel of station 12'. The user of subscriber station 12 sends a string whose length depends on the number of channels being used (i.e. a 6-byte string for 6 channels) through the segmenting process. Preferably, the first byte has a value of 1 and is sent over the first 'B' channel, the second byte a value of 2 and is sent over the second 'B' channel etc., such that the string is transmitted as 1-2-3-4-5-6. If the channels are not synchronized, the subscriber station 12' may receive this string as 3-4-1-5-2-6, indicating the first channel of station 12 is communicating with the third channel of station 12', etc.

The HSDT software then logically orders the channels of station 12' such that the first channel on station 12' is in communication with the first channel of station 12, the second channel of station 12' is in communication with the second channel of station 12, etc. and sends the same string over the network back to station 12 for verification of synchronization.

The HSDT software package initiates sending each segment over the 'B' channels such that the transfer of data occurs substantially simultaneously at the channels' respective data rates. When all segments of the logical connection have been received at the subscriber station 12', the following occurs: (1) the user of subscriber station 12' is given an indication that a block of data has arrived along with the total length of said data; (2) the user provides a reference to the HSDT software product of a reference to memory and the length of this memory; and the HSDT software package (3) moves the transferred segments into the memory (e.g. a buffer) of subscriber station 12' at the reference such that the resulting block of data matches verbatim the block of data that was transferred from the sending subscriber station 12.

It should be appreciated that a protocol process could be utilized in the PCTA 24 to implement the actual transfer over independent 'B' channels. With the protocol process, the information to be sent is "packaged" with additional information, such as error check bits. When the information is received, the receiving station utilizes the error check bits to verify the integrity of the information sent.

Choosing the Cancel button 188 will close the window and return to the main window. The user may exit this window by choosing either the Select button 186 or the Cancel button 188.

Sending A File Progress

Figure 10:
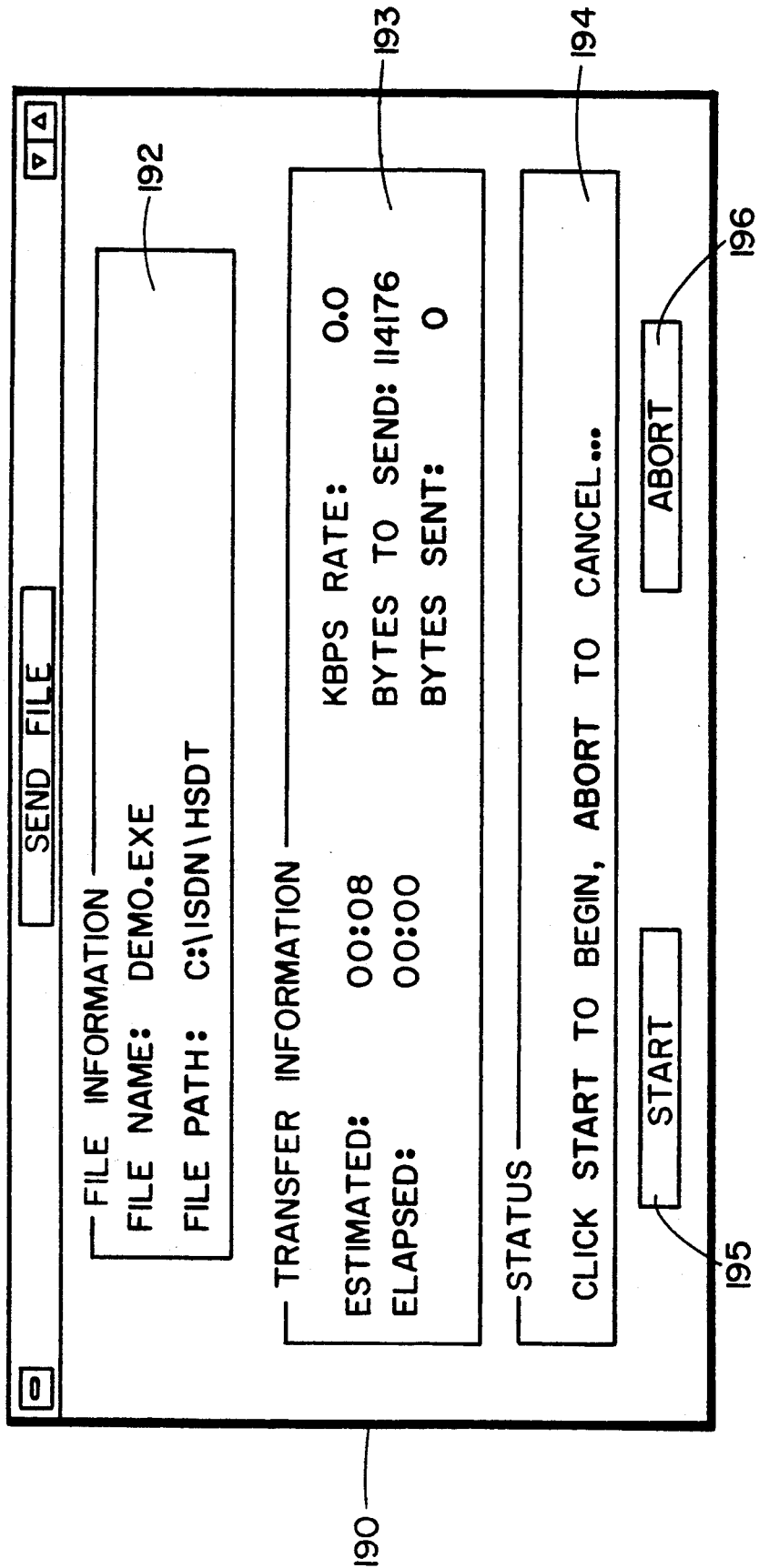
FIG. 10 is an illustration of the Send File Window.

This operation will only transpire if the user has selected a file to send from the Select File to Send Dialog Box 174 or if an incoming file request has been accepted. When the user selects a file to send, the Send A File Window 190, as shown in FIG. 10, will be displayed. It should be appreciated that this window cannot be directly accessed from the menu.

The Send A File window 190 primarily relays information and requires little or no user input. At the top of the window is the File Information Box 192, which contains information about the file being sent or received. This preferably includes the name and path of the file on the local machine. The Transfer Information Box 193 also contains information relating to the transfer, preferably the estimated total time of the transfer, the elapsed time of the transfer thus far, the approximate kbps rate of the transfer, the total number of bytes to send and the number of bytes sent thus far. This information is updated as the transfer progresses. The Status Box 194 operates to provide the user with messages, such as how to initiate the file send or to indicate the file transfer has been completed.

The only controls the user can control are the Start button 195 and the Abort button 196, both located generally at the bottom of the screen. The Start button 195 is utilized to start the file send and the Abort button 196 should be selected to stop the transfer before it has completed.

This window may be minimized by the user if they do not wish to watch the file transfer. This may be useful, for example, if a long file transfer is started and the user wishes to 'chat' with the subscriber station 12' during the transfer.

The user can thus exit the window by selecting the Abort button 196. Additionally, the window will close after the user responds to the message that the transfer has completed successfully.

Receiving a File

Figure 11:
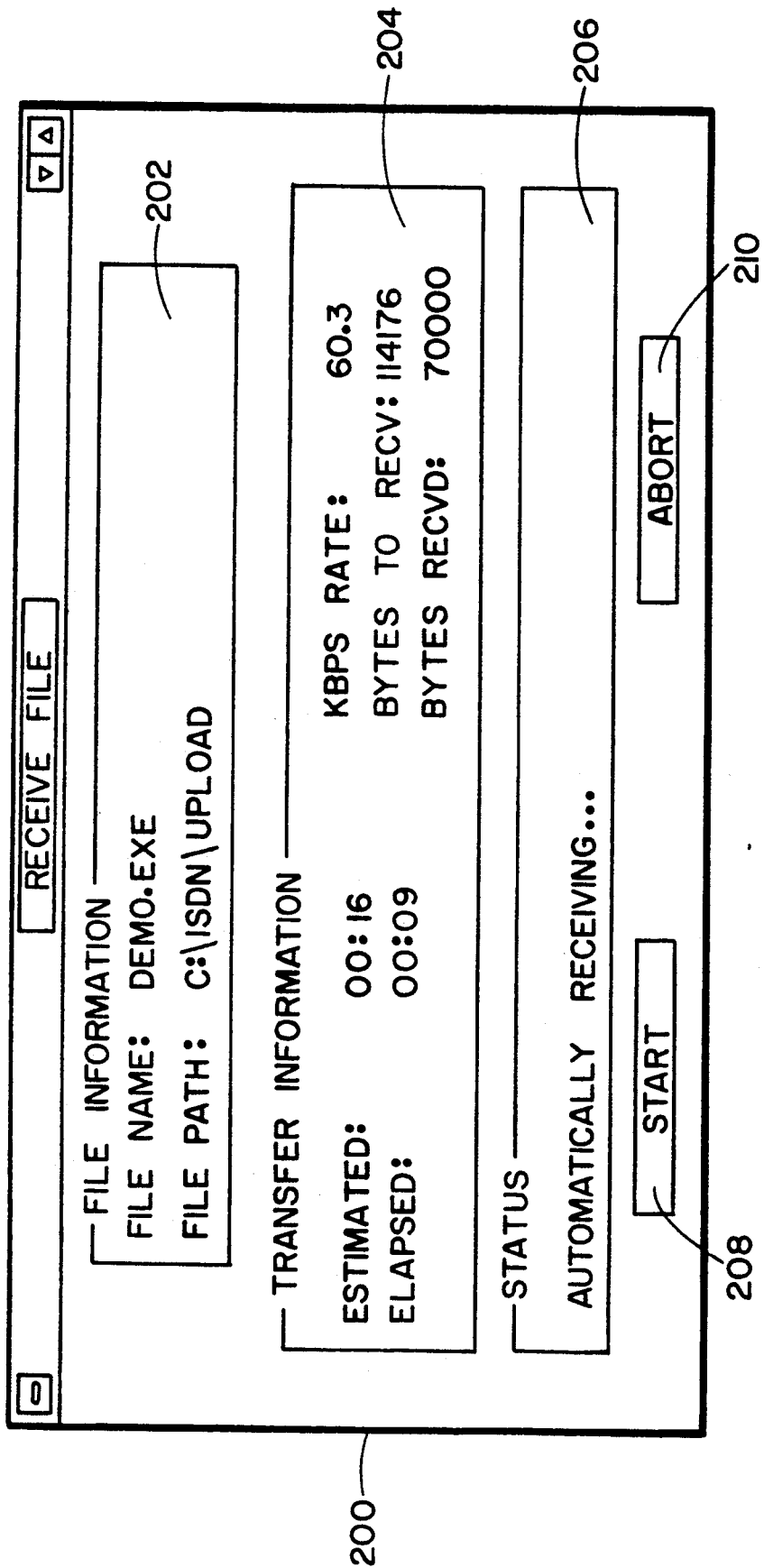
FIG. 11 is an illustration of the Receive File Window.

The ability of a first subscriber station 12 to receive a data transfer allows a second subscriber station 12' to send data at any time, simultaneous on all 'B' channels at their respective data rates. The ability to receive a file, however, will only be available if at least one logical connection exists. When a request for a file transfer comes in from the network, the Receive File Window 200, as shown in FIG. 11, will appear. It should be appreciated that this command cannot be accessed from the menu and that the user may set up the station 12 to automatically receive file by selecting the "Auto Receive" option from the Options Menu.

The Receive File window 200 is similar to the Send A File window 190. At the top of the window is the File Information Box 202, which contains information about the file being sent or received. This preferably includes the file name and path specified by the sending subscriber station 12'. The Transfer Information Box 204 also contains information relating to the transfer, preferably the estimated total time of the transfer, the elapsed time of the transfer thus far, the approximate kbps rate of the transfer, the total number of bytes to receive and the number of bytes received thus far. This information is updated as the transfer progresses. The Status Box 206 operates to provide the user with messages, such as how to initiate the receipt of the file or to indicate the file is being received automatically, if the Auto Receive option is set.

The only controls the user can control are the Start button 208 and the Abort button 210, both located generally at the bottom of the screen. The Start button 208 is utilized to start the file receive and the Abort button 210 should be selected to stop the transfer before it has completed. If the file transfer completes successfully, a status message will appear indicating the transfer is complete and the window 200 will then disappear.

When all segments of the logical connection have been received, the following occurs: (1) the first subscriber station 12 is given an indication that a block of data has arrived along with the total length of said data; (2) the user of subscriber station 12 provides a reference to the HSDT software of a reference to memory and the length of this memory; the HSDT software package (3) moves the transferred segments into the memory of subscriber station 12 at the memory reference such that the resulting block of data matches verbatim the block of data that was transferred from the sending subscriber station 12'. The segments are then written to the disk file.

Choosing the Reject button 210 will close the window and return to the main window. The user may exit this window by choosing either the Accept button 208 or the Reject button 210.

Sending a Message

Figure 12:
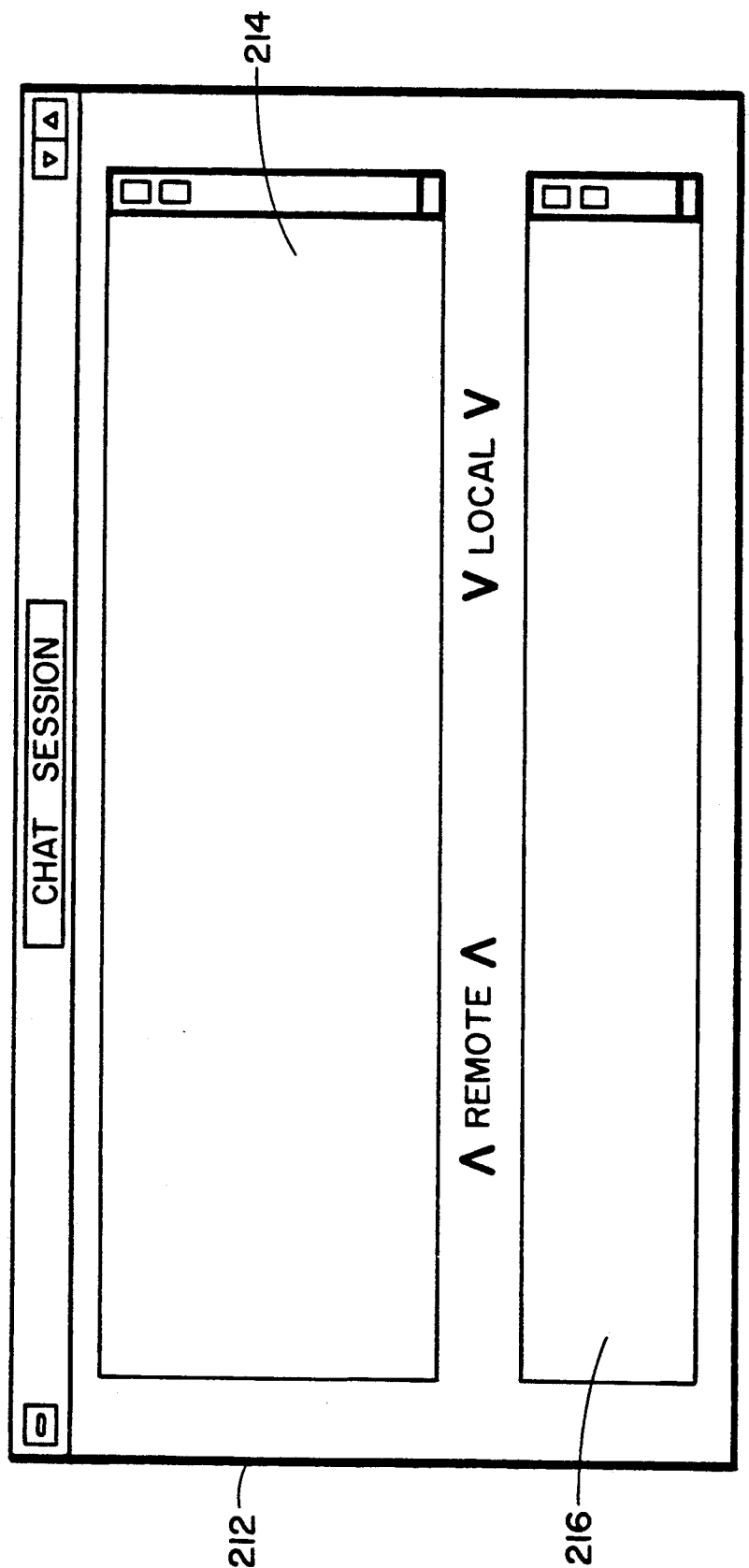
FIG. 12 is an illustration of the Chat Session Window.

The ability to send a message will only be available if at least one logical connection exists. When a user wishes to send a message to another system, they will enter "chat mode" and the Chat Session Window 212, as shown in FIG. 12, will be displayed. This is done by choosing the Chat Session command from the Services menu.

The Chat Session Window 212 is preferably split into two sections. The Remote Box 214 of the window is where received messages will be displayed. The Local Box 216 is where messages to send may be typed. The user can send a message by simply typing in the lower window. Hitting the Enter key after each line will cause it to be sent. The window can be minimized in order to see other windows if desired. The window 212 is closed by selecting Close from the window's Control menu.

Instead of an interactive "chat", the user may wish to just send a message to the other user. To send a message, the Send Message command is selected from the Services Menu. The Send Message Window (not specifically illustrated) will appear. The Send Message Window consists of a small box in which the user types the message to be sent. When the user has typed in the message, it can be sent selecting the SEND button. The sender may instead CANCEL the message operation. The send can request a return receipt by checking the return receipt entry in the menu. If the Return Receipt option from the Options Menu is selected, a message informs the user that the message was read.

Receiving a Message

Similarly, the ability to interactively "chat" or to receive a message will only be available if at least one logical connection exists. When a message is received from a remote subscriber station 12' over the network, the receiving station 12 will enter "chat mode" and the Chat Session Window 212 will be displayed, as described above. If the station 12 is already in this mode, the message will simply appear in the Received Messages portion of the window. As noted above, the Remote Box 214 is where received messages will be displayed. The user can response to the messages by simply typing them in the Local Box 216. The user may exit this window by selecting close from the Control menu.

Voice Features

Figure 13:
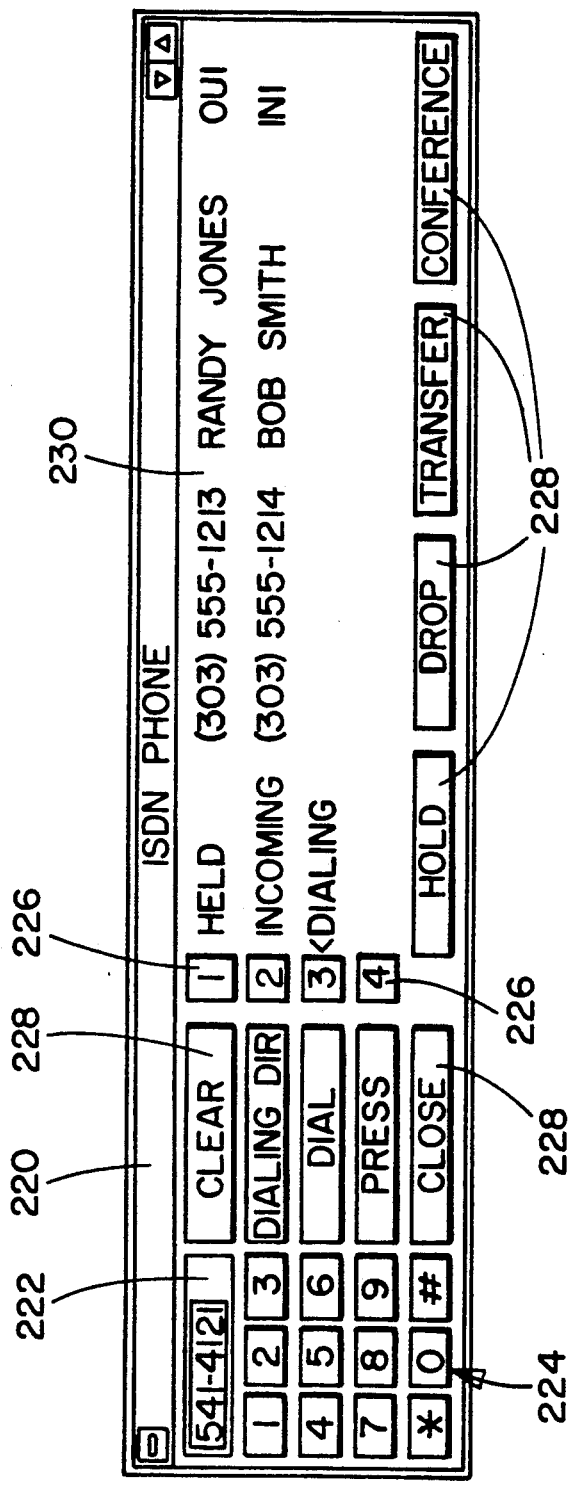
FIG. 13 is an illustration of the ISDN Phone Window.

The HSDT software will provide the features of an ISDN phone on the PC, so that even an analog-type phone may be used as an ISDN phone through the combination of the phone, the software and the ISDN PCTA. When voice features are active, the ISDN Phone Window 220, best shown in FIG. 13, appears. Voice features can be activated from the Setup Call Window 140 or by lifting the phone hook and are implemented by the AV module of Layer 50.

In the preferred embodiment, the ISDN Phone Window 220 contains an edit field 222, a keypad 224, a plurality of function buttons 226, a plurality of feature buttons 228 and a display area 230 in which call appearances are displayed. As shown, a call appearance includes the status of the call (i.e. held, incoming), the phone number and the name of the party associated with that phone number. The edit field 222 is a field into which a telephone number may be typed by the user. The display area 230 also includes an Incoming Call Identification (ICI) field 232, in which information relating to the call (e.g. incoming, outgoing, etc) is displayed.

The function buttons 228 provide the user with a variety of phone features common to an ISDN phone, such as hold, drop, transfer and conference. Additionally, "Clear" allows the user to erase the number typed into the edit field 222. However, if the user wishes to use the number entered into the edit field 222, the Dial function button is preferably selected to place the call.

Instead of typing a number into the edit field 222, the user may select the Dialing Dir button and select a number from the dialing directory. To select a call appearance (e.g. pick-up a call placed on "hold"), the user preferably can either "click" the mouse on the feature button 226 adjacent to the desired call appearance, or type in the feature button number in the edit field 222 and then select the Press function button 228.

In the preferred embodiment, the phone window is opened when a call appearance is active, or when an "off-hook" or incoming indication is received while an incoming call is not present (i.e. just as though the phone option had been selected from the Services menu). The phone window is also opened when an incoming call is attempting to make a connection, and the caller is identified to the user. It should be noted that the same window is utilized on both the calling station and the called station of the connection. Any user messages originating from the central office 5ESS switch, the PCTA board or the software will be displayed in the window to the user.

When a completed call is terminated, the phone window preferably remains displayed and the 'B' channel reserved for the call remains reserved (i.e. just as though the phone option had been selected from the Services menu). It should be appreciated that the phone window, like the other windows previously described, may be minimized by the user, even while a call is in progress. The phone service will be ended (and the reserved 'B' channel released) when the phone window is closed by the user.

The phone option is present on the Services menu. The phone option on the Services menu is preferably "grayed" when the option is not available. When the phone option is selected from the services menu, the software reserves a 'B' channel on the first PCTA card for voice and the phone window 220 is opened for the user. As discussed above, the user preferably dials a phone number by using the dialing directory or typing the number into the edit field 222 of the window. The user may also dial the number directly on the phone 28 keypad. If the number is dialed directly on the phone keypad, the number may show up in the window (depending on the type of PCTA utilized) since the software does not sense the phone's numeric keys being depressed.

A Voice call connection is possible if a 'B' channel has been reserved or is available. Although existing connections are preferably not "juggled" to accommodate a voice connection, such a feature is possible.

In the preferred embodiment, a software module accommodates the necessary code for handling regular voice phone calls. The module includes a procedure exported to Windows for handling messages from the Windows event queue (i.e. AV_WndProc). The phone option setup routine is preferably labeled AV_Setup, and its completion routine is labeled AV_Cleanup. The setup and cleanup routines have CreateKids and KillKids routines to do the actual creation and destruction of buttons, text, etc. on the phone window, which is the "parent" of these objects. The messages concerning the call itself (e.g. on-hook, off-hook, display messages, feature messages, etc.) are passed into the module by calling AV_Event (which processes Resource Layer events).

Voice Call Window

When a voice call request arrives (a call appearance is active), the ISDN Phone window 220 displays information on the call such as the calling party's number, the calling party's name (if it is found in the Dialing Directory). As previously described, for a voice connection to be permitted, at least one 'B' channel must be available. In the preferred embodiment, this allows for voice connections even during high speed data transfers (i.e. simultaneously). The window is removed when the phone 28 is placed on-hook or the Reject button 166 is chosen.

User And Network Initiated Events

Events can be initiated by the user or by the network. If allowed, the appropriate window for the event is displayed and that event is initiated or responded to in that window.

Request Data Connection

This event is initiated by the USER upon choosing the Setup Call command, thereby establishing a logical connection with a remote subscriber station 12'. This request may only be made when there is an available 'B' channel. The system allows for multiple data connections to be established, up to the number of 'B' channels that exist. Additionally, if the voice features are active, the maximum bandwidth available will not include one of the 'B' channels (the one being used for the voice connection). First, the user enters the 'Setup Call' window 140, selects the bandwidth (i.e. number and type of channels to combine), data rate and number to call and chooses CONNECT. The subscriber station 12' sees the 'Incoming Call' window 162 to acknowledge the connection. Once the connection is established, either user may initiate file sends, or send a message. Statistics on this existing connection are displayed in the 'Connection statistics' window, when selected.

Incoming Data Connection Request

This event is NETWORK initiated, when a first user requests a connection with a second user. If there are no 'B' channels available, an automatic denial or rejection is sent back to the requester. If the connection is allowable, the user still has the option to either ACCEPT or DENY the connection request. Once a connection is established, either user may initiate File Sends, Chat Message, or Send Message.

Phone Off-hook to Initiate Voice Call

This event is USER initiated and is allowed only when there is an available 'B' channel on the B101 PCTA 24 connected to the phone 28. When there is not an available 'B' channel, an appropriate message will be displayed. Whenever the phone 28 is 'off-hook' and a 'B' channel is available, the ISDN Phone window 220 will be displayed. The user may initiate a call by dialing on the phone 28 (provided the PCTA supports the capability), using the keyboard 20 to type a number into the window, or making a selection from the dialing directory. While a voice call is active the user may choose hold, conference, transfer or drop from the window. To remove the ISDN Phone window 220 the user must hang up the phone 28. The feature buttons 226 may be selected by typing the desired feature button number in the edit field 222 and then "clicking" on the Press function button 228.

Phone On-hook to End Voice Call

This event is USER initiated by placing the phone 28 back 'on-hook'. If the ISDN Phone window 220 was displayed, it will be removed by this event, provided that no other Call Appearances are active. In the case that the phone 28 was initially taken off-hook when a voice call was not allowed, causing an appropriate message window to appear to the user, placing the phone 28 back 'on-hook' will remove this message window.

Incoming Voice Call Request

This is a NETWORK initiated event. When this request is received, the 'Incoming Voice Call' window will appear. The user can pick up the phone 28 to accept the call, or may press the associated call appearance button to pick up the speaker phone (i.e. if the PCTA is so equipped).

Initiate Disconnect of Data Connection

This USER initiated event occurs when the user wishes to terminate an existing logical connection. The user enters the Disconnect Call Window 161 and select the Disconnect button 149. If a File Transfer or Chat Session is in progress when the Disconnect button 149 is selected, they will be aborted and the window will be closed.

File Transfer Aborted

Initiated by the USER, this event occurs by selecting ABORT from the Send File Window 190. This event removes the 'File Transfer In Progress' window 190 from the screen. At this point, the other side of the connection receives the 'File Transfer Aborted' event as a NETWORK initiated event. This causes a message to be displayed indicating that the transfer was aborted. When the receiver selects OK, the File Transfer Window 190 will disappear and the file transfer process will have been aborted.

Data Disconnect Received

This is a NETWORK initiated event. When the logical connection is terminated, both subscriber stations 12 and 12' will receive the message 'Connection Terminated'. The message remains on-screen until the user selects 'OK'.

Initiate File Transfer

Initiated by the USER, this event is executed from the 'Select File To Send' window 174. As described above, this window is available only if a logical connection exists. When available, the user selects a file to send and chooses either SELECT or CANCEL. Before the user choose SELECT or CANCEL, statistics on the currently selected field will be displayed, showing file size, estimated time to send, etc. As described above, once SELECT is chosen, the 'Select File To Send' window 174 will be replaced by the Send File Window 190, and the status of the transfer will be displayed there. The receiving side will get an indication that a file transfer has been requested, and has the option to ACCEPT or DENY the transfer.

File Transfer Completed

This event, initiated by the NETWORK on both sides, causes a message to be displayed indicating that the high speed data transfer was successfully completed. When the user selects OK, the Send File Window 190 will disappear.

Receive File Transfer Request

This is a NETWORK initiated event which will cause the 'Receive File' window 200 to be displayed. Within the window 200, the user will be able to select a file path and a file name to save the file. Various statistics relating to the receive will be shown, including file name, size of file, estimated time to send, and the path. If there is not sufficient space on the disk selected, ACCEPT will not be available. ACCEPT when available or DENY with an optional reason must be selected.

Send a Message

This USER initiated event is only available if a logical connection exists. Once the Send Message window (not specifically illustrated) appears, and the user has typed in the message, it can be sent by choosing SEND or it may be cancelled by choosing CANCEL, as previously described. If SEND is chosen, a 'Receive Message' event, described herein below, will occur on the receiving subscriber station. The message can then be removed by choosing OK.

Receive a Message

This event is initiated by the NETWORK when a remote station sends a message. This causes the Send A Message window to appear displaying the message sent. To insure that the message gets read by the user, this window will remain until OK is selected.

Chat Session

This is a USER initiated event at one end of the network (the end from which the chat session is originating), and a NETWORK initiated event at the other end. This event causes the Chat Session Window 212, as described in greater detail above, to appear on the screen.

HSDT Control Flow

Figure 14:
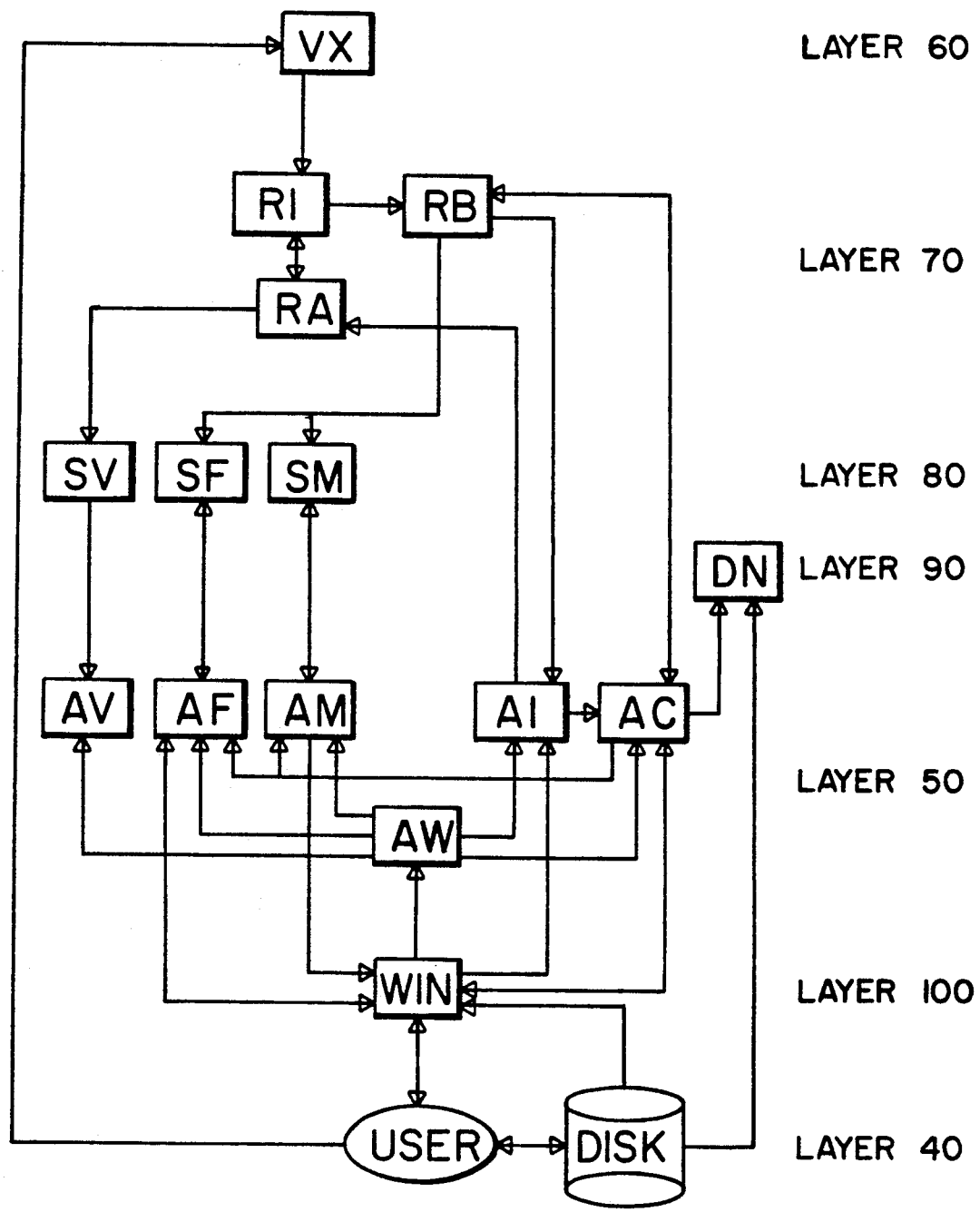
FIG. 14 is an illustration of the various software modules of the HSDT software and the information flow between during execution of the HSDT software.

Turning now to FIG. 14, the entire data and control flow through the HSDT software during its execution is shown. FIG. 14 also shows every module that comprises the software and shows how information flows between them. Generally, the modules are grouped into their respective layers.

FIGS. 15-19 break the program and control flow into more manageable and understandable parts. In general, the following rules apply to the diagrams:

(1) Arrows pointing "up" are function calls.
(2) Arrows pointing "down" are callback functions.

The two-letter codes associated with each module, such as "VX", are intended to be used to identify the source code filename for this module as well as prefixing each of the public interface symbols (function names, typedefs, #defines, etc.) within the module. Each of these modules are intended to be implemented as a single source code file. For clarity, public symbols should be placed in a header file of the same name (i.e. VX.C and VX.H).

In the preferred embodiment, program execution is divided into 5 general areas of flow. They are:
1. Asynchronous events (FIG. 15);
2. Disk access (FIG. 16);
3. Service Layer 80 and Resource Management Layer 70 support (FIG. 17);
4. User/application communication (FIG. 18); and
5. User generated events (FIG. 19).

Each of these areas are described in detail herein below.

Asynchronous Events

Figure 15:
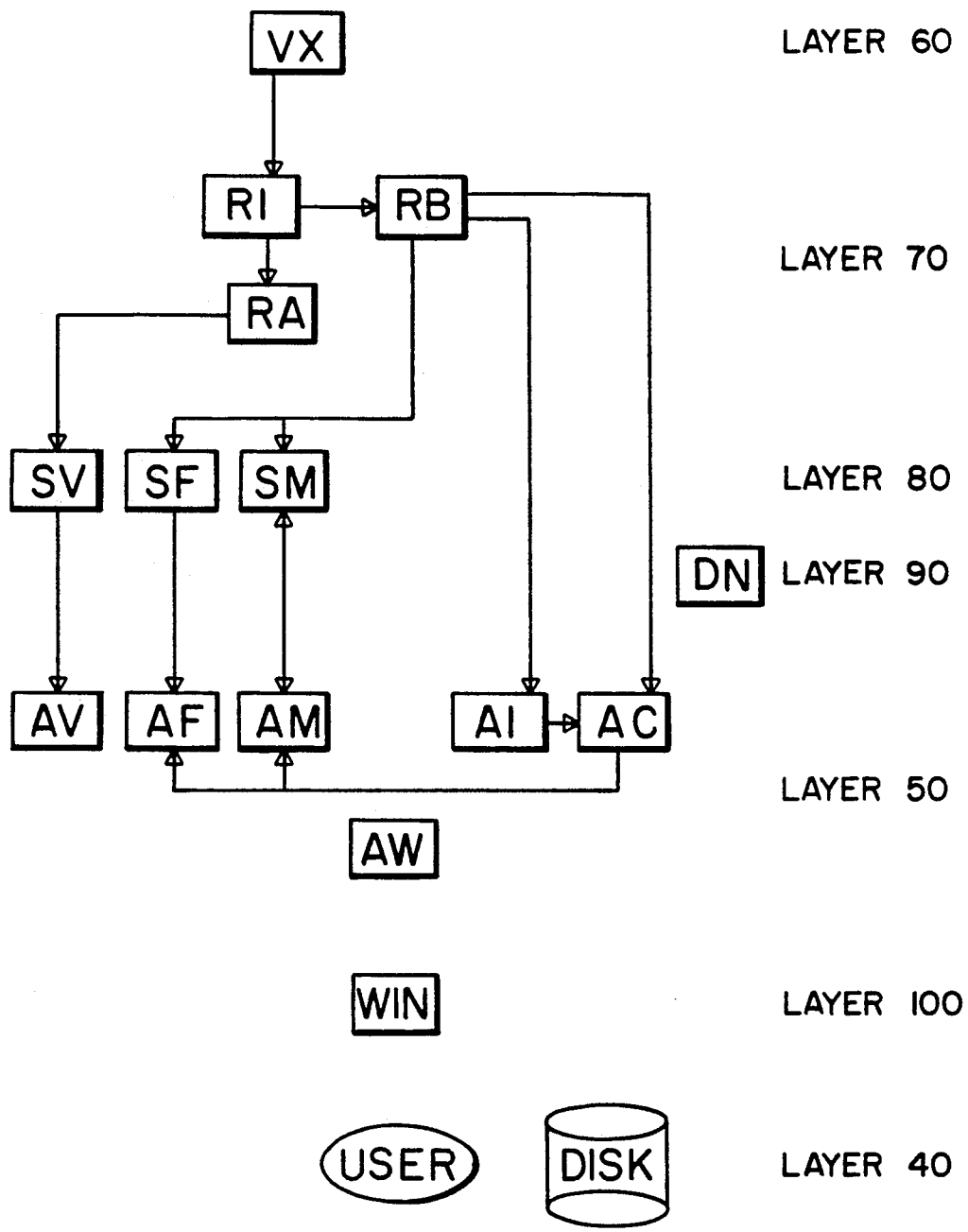
FIG. 15 is an illustration of the information flow between software modules during asynchronous events processing.

FIG. 15 shows the flow of asynchronous events through the modules involved in processing these events.

Asynchronous events can potentially occur at two locations: Keyboard and Teleos hardware. All user (keyboard) events are synchronized by Microsoft Windows, discussed in greater detail below, and delivered to the main application when requested (i.e. not asynchronously). All network (Teleos) events are delivered to the VX module as asynchronous events. These events are then delivered to the RI module either through interrupts, or polled through VX_Poll().

| FLOW: | EVENTS | PROCESSING AT DESTINATION: |
|---|---|---|
| VX > RI | Voice state changes | Passed directly to RI |

-continued

| FLOW: | EVENTS | PROCESSING AT DESTINATION: |
|---|---|---|
| | B Channel: control and data | Passed directly to RB as |
| | X.25 Sessions control: | Dealt with internally to RI |
| | X.25 Session data | Passed to RB |
| RI > RA | Voice state changes | Passed directly to RA |
| RI > RB | B Channel control: up/down | Used to indicate connection |
| | B Channel data sent | Notify sender (SM or SF) |
| | B Channel data rcvd or non-session (AC) | Deliver as session (SM/SF) |
| | Connection setup | Begin B channel connections |
| | Connection request | Locate application callback, send to AI |
| RA > SV | Voice state changes events for AV | Converted to three possible |
| RB > AC | Connection up | Remove dialing window |
| | Connection lost w/reason window, show user | Update connection view |
| | Non-session data requests | Deliver as new service |
| RB > SF or SM | Session lost | Cleanup service, tell AF or AM |
| | Session data received disk & mark buffer free | Prepare to store buffer to |
| RB > AI | Connection request | Passed to the AC module |
| SV > AV | Hook state change window | Que to create/destroy voice |
| | Call connected | Que for display |
| | Call disconnected | Que for display w/reason |
| SF > AF | Service lost cleanup | Remove file transfer window, |
| AI > AC | Connection request connection | Allow user negotiation of |
| AC > AF | File send request | Que to handle later |
| AC > AM | Message received user, notify SM | Que to display message to |
| AM > SM | Message data received | Copy to local buffer |

Disk Access

Figure 16:
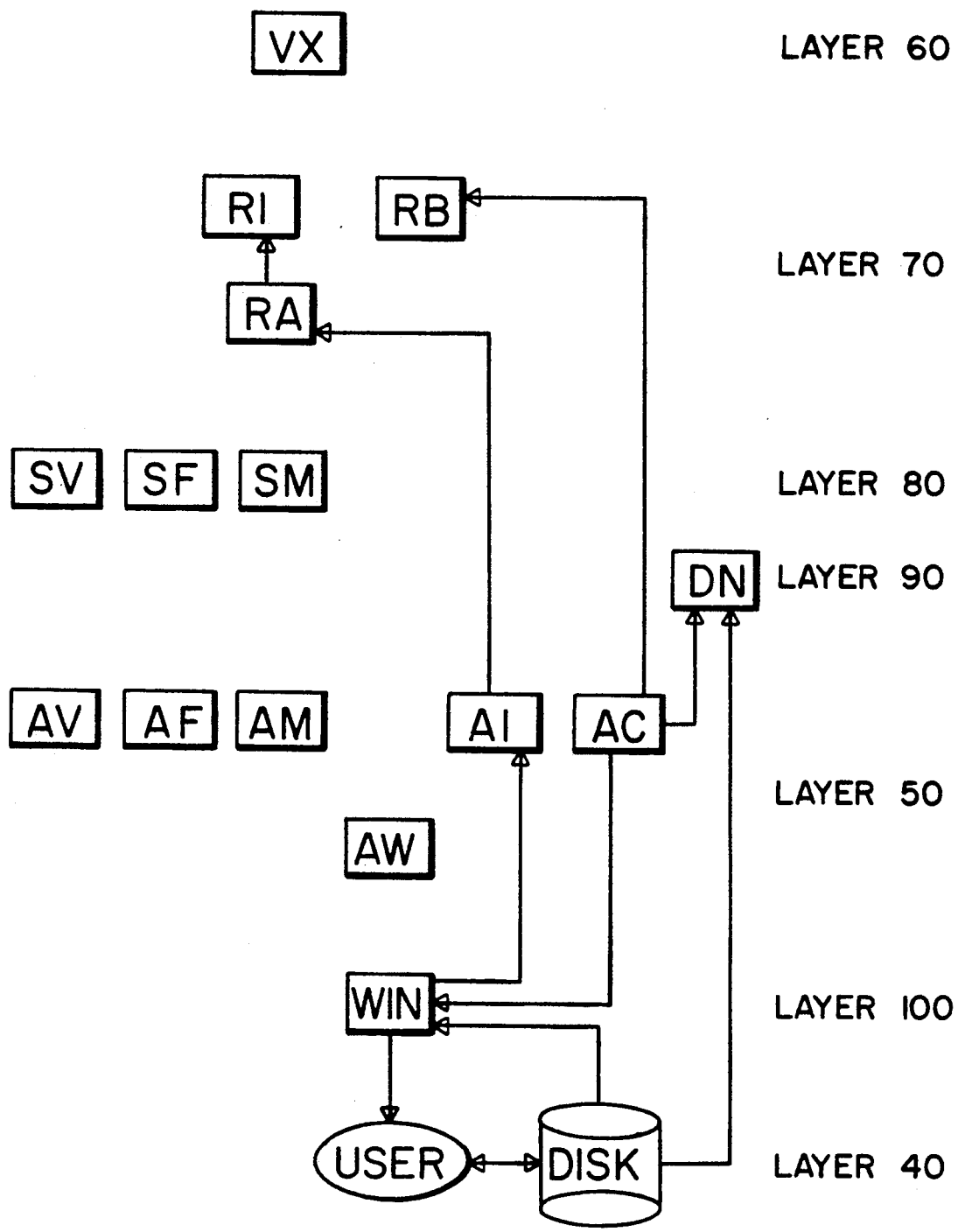
FIG. 16 is an illustration of the information flow between software modules during disk accesses for configuration and database information.

FIG. 16 illustrates which modules are involved in accessing data files on the disk 30 for configuration and database information.

Access to the hard disk is required once at startup to get configuration information, much of which is sent to the Resource Management Layer 70 to identify the ISDN hardware configuration, and during runtime to locate and list names and associated phone numbers. The latter accesses are required either when a connection request is received and the associated remote phone number must be identified locally for the user, for connection acceptance, or when a connection request is being made locally, to allow the user to choose from a list of names to connect to.

| USER > DISK | Modifications of data files outside scope of this program |
|---|---|
| WIN > USER | Displayed names/addresses in graphics window |
| DISK > WIN | Access to WIN.INI file (formate described below) |
| DISK > DN | Names and Addresses file access |
| AC > DN | Calls to get name and address information |
| AC > WIN | Write to window to display name and address information |
| WIN > AI | Delivery of WIN.INI file information |
| AC > RB | Final phone number choice delivered to resource layer |
| AI > RA | Initialization of Res. Mgmt. Layer 70 using WIN.INI config settings |
| RA > RI | Initialization of ISDN hardware parameters passed up to RI module |

Database File Structure

The database file is completely accessed though the DN module (part of the Database Layer 90) by the AC module (part of the Application Layer 50) which is managing connections for the HSDT software. In the preferred embodiment, the DN module will utilize a single disk file (NAMES.DAT) that will be built using a user's favorite text editor.

The Names and Numbers database will exist as a flat ASCII file and consist of lines of the format: Name:-Number. The Name field can be up to 64 characters long and may contain spaces. The Number field can be up to 24 characters and may contain some other characters. Dashes and Parens can be included and will be stripped for dialing purposes. Ex: John Q. Public:1(303)930-2544 is acceptable.

The configuration information will be located in a single disk file (WIN.INI) that conforms to the Microsoft Windows "INI file" format described below. Access to this file will be made by the AI module through Microsoft Windows API during runtime, and may be modified by the user using NOTEPAD or by invoking the user's favorite text editor.

Under an entry called [HSDT], the following lines may exist: Label = value

Currently, the following labels and value ranges may be specified: Cards = n where 'n' may be 1, 2 or 3

The following lines must be specified many times (2 times 'n' above). Each line must have a unique 'Label' by specifying different values for 'C' and 'B' Phone C,B = ####### 'C' between 1 and 'n' above; 'B' is 1 or 2

An example WIN.INI file for two cards on the AT&T 5ESS switch ('B' channels have same number) is as follows:

Cards=2
Phone 1,1=2901009
Phone 1,2=2901009
Phone 2,1=2901010
Phone 2,2=2901010

Service Layer and Resource Management Layer Support

Figure 17:
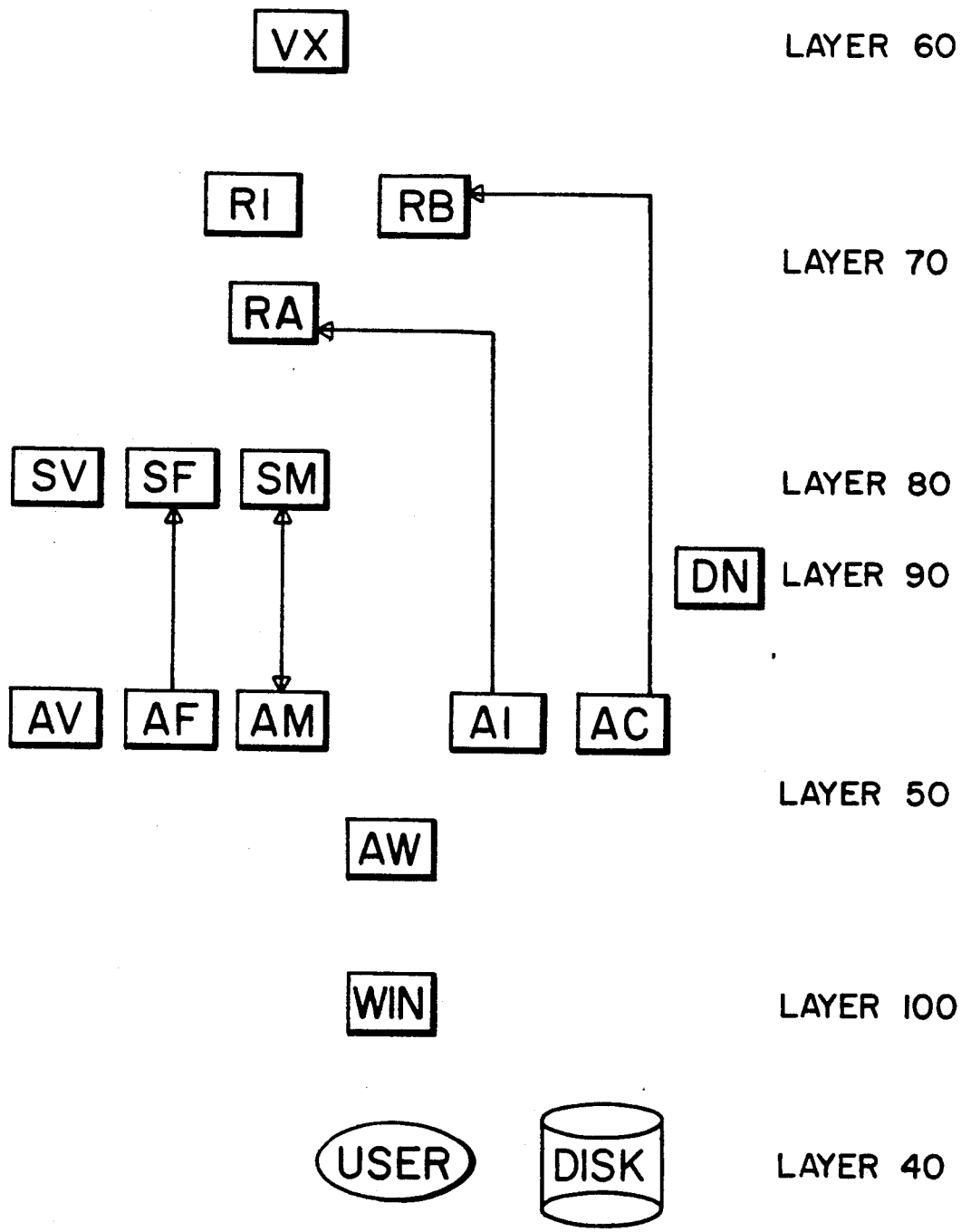
FIG. 17 is an illustration of the access to the Service Layer and the Resource Management Layer by the Application Layer.

FIG. 17 shows the access to the Service Layer 80 and the Resource Management Layers 70 by the Application Layer 50.

Each module's access needs toward the service and resource layers are as follows.

| | |
|---|---|
| AI > RA | Initialize resource layer/register application by name; |
| | Clean up resource layer |
| AC > RB | Make a connection request; |
| | Acknowledge a request for a connection; |
| | Get the status of any connection; |
| | Terminate a connection |
| AM > SM | Send a message |
| | Retrieve a message |
| AF > SF | Request to send a file |
| | Allow receipt of a file |
| | Abort file send |

User/application Communication

Figure 18:
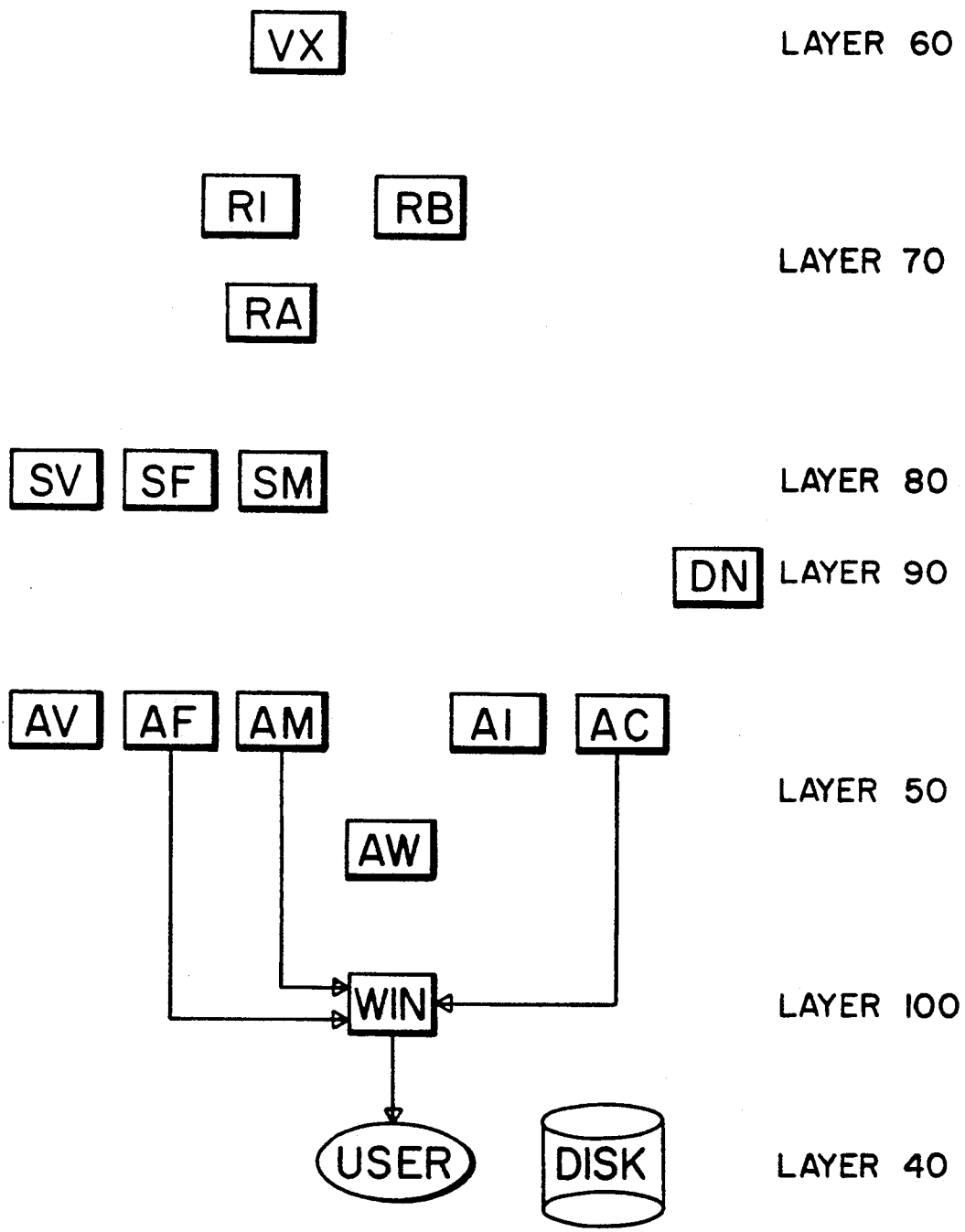
FIG. 18 is an illustration of the information flow between the user and the Application Layer software modules during execution of the HSDT software.
Figure 19:
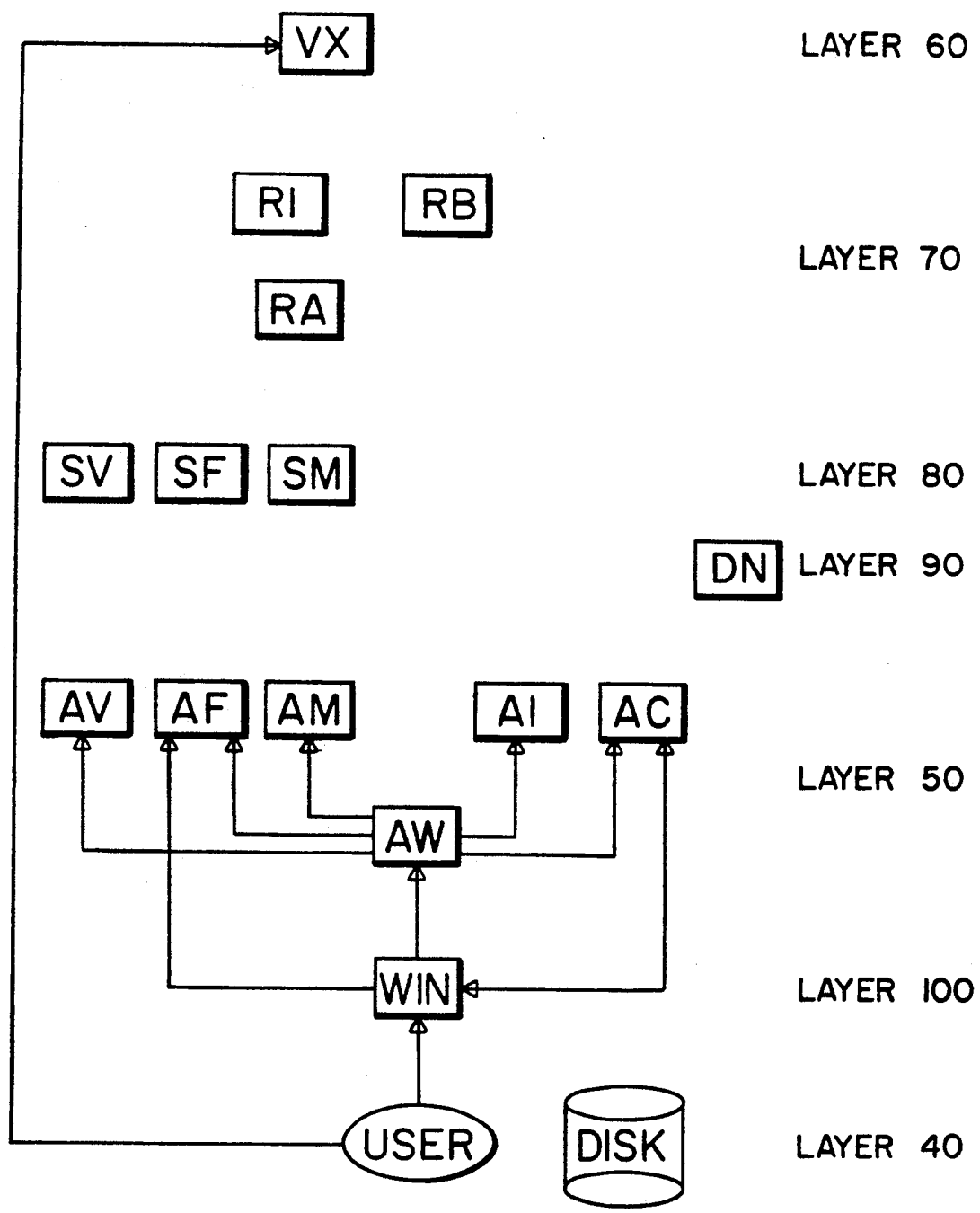
FIG. 19 is an illustration of the information flow between software modules during user-generated events processing.

FIG. 18 shows the flow of information tot he user from the various application modules.

Every piece of information conveyed to the user will be through windows on the VGA monitor 16 used as display boxes or as dialog boxes (the latter used also to receive input from the user).

| | |
|---|---|
| WIN > USER | Actual drawing on the screen of windowed information; |
| | Menu items used to convey which activities can be initiated; |
| AF > WIN | Initiate sending a file (Gives list of files on disk and their sizes); |
| | File transfer in progress (Shows progress of file transfer); |
| | Accept receipt of file (Shows remote user's file name, size, etc.) |
| AM > WIN | Send a message (Shows message as entered, allows editing); |
| | Receipt of a message; |
| AC > WIN | Setup a call (Gives list of names/numbers and data rates); |
| | Statistics on connections (Up/down, with whom, data rate, etc.); |
| | Incoming data connection request (Data rate, bandwidth, name, etc.) |

User Generated Events

Turning now to FIG. 19, the flow of user-generated events between modules is illustrated.

| | |
|---|---|
| USER > WIN | User executes program from Windows which performs initialization; |
| | Chooses Exit from File menu; |
| | Chooses Connect from Call menu; |
| | Chooses Hangup from Call menu; |
| | Chooses Send file from File menu; |
| | Chooses Send message from Services menu; |
| | Accept incoming connection through dialog box; |
| | Accept incoming file send request through dialog box: |
| | Deny incoming file send request through dialog box; |
| | Choose Voice Call off of Menu; |
| USER > VX | User takes phone off-hook; |
| | User puts phone on-hook; |
| WIN > AW | Call to WinMain( ) to initialize program |
| | Exit request |
| | Connect request |
| | Hangup request |
| | Send file request |
| | Send message request |
| WIN > AC | Accept incoming connection |
| | Deny incoming connection |
| WIN > AF | Accept incoming file |
| | Deny incoming file |
| AW > AI | Initialize resource layer |
| | Clean up resource layer |
| AW > AC | Connect request |
| | Hangup request |
| AW > AV | Bring up/down Voice Call Window |
| AW > AF | Send file request |
| AW > AM | Send message request |

Theory of Operation

When the program begins execution, the Application Layer 50 will initialize itself, and make initiation calls to the Service Layer 80 and the Resource Management Layer 70. Eventually, either the user or the network will initiate a logical connection, followed by requests to do a file transfer, a message send, or to control the phone line. Finally, the logical connection is terminated, and the cycle can begin again, or the program is exited after shutting down each of the layers that had been initialized.

The following sections detail the flow of data and control in a sampling of activities that may be performed during a typical session: initialization, establishing a connection, sending a file, sending a message. In each of these scenarios, the activity begins with the user initiated event, and shows the resulting network initiated events expected on both the subscriber stations 12 and 12'.

| Initialization | |
|---|---|
| USER > WIN | User executes program |
| WIN > AW | WinMain( ) is called, creating main window |
| AW > AI | ISDN initialization function is called |
| DISK > WIN > AI | ISDN config. info. is read from disk via Windows calls |
| AI > RA | Application initializes and registers itself with resource layer |
| RA > RI | Initializaion request sent to ISDN interface module |
| RI > VX | Hardware is finally initialized |

Establishing a Connection

It should be noted that each "indented" line represents activity occurring at the subscriber station 12'.

| | |
|---|---|
| USER > WIN | User selects call setup from connections menu; |
| WIN > AW | Call setup request sent to application; |
| AW > AC | Calls call setup function; |
| AC > WIN > USER | Displays connection dialog box; |
| USER > WIN > AC | User sets options, requests connection; |
| AC > RB | Application requests bandwidth selected by user; |

-continued

| | |
|---|---|
| RB > RI | Request to send connection request message (X data); |

The following could also be implemented utilizing circuit-switched channels or UUI information in a call setup.

| | |
|---|---|
| RI > VX | Request X25 session; |
| VX > RI | X25 session request |
| RI > VX | Accept request |
| VX > RI | X25 session connected end-to-end; |
| VX > RI | X25 session connected end-to-end |
| RI > VX | Send X data (connection request from RB); |
| VX > RI | Receives data on connection request |
| RI > RB | Delivers X data to RB |
| RB > RB | Give connection request to event router |
| RB > AI | Deliver request to particular application |
| AI > AC | Deliver request to connections module |
| AC > WIN > USER | Display incoming call request |
| VX > RI | X25 data was sent; |
| RI > RB > AC | Notifies AC that request was sent; |
| RI > VX | Disconnect X25 session; |
| VX > RI | X25 session disconnected. |

Idle until user responds to incoming call dialog box.

| | |
|---|---|
| USER > WIN > AC | User accepts connection |
| AC > RB | Connection accept deliver to RB |

The bandwidth allocator module, RB, delivers acknowledgement to station 12' via X25 session data (similar to above).

| | |
|---|---|
| VX>RI | X25 data received; |
| RI>RB | X data containing acknowledgement of connection; |
| RB>AC | "Connection is proceeding"; |
| RB>RI | initiate B channel connections |

There will be a series of B channel messages (RI>VX, VX>RI) on both sides.

| | |
|---|---|
| VX>RI | Last B channel connected, ready to send; |
| RI>RB | Last B channel connected, ready to send; |
| RB>AC | Connection is established; |
| VX>RI | Last B channel connected, ready to send |
| RI>RB | Last B channel connected, ready to send |
| RB>AC | Connection is established. |

Sending A File

| | |
|---|---|
| USER>WIN>AW>AF menu, sent to AF module | User chooses Send File from File |
| AF>AC | Get status of current connection |
| AF>WIN>USER | Display Send File Request dialog box |
| USER>WIN>AF send request | User chooses a file to send, "OK"s |
| AF>SF | Application tells service to send file |
| SF>RA | Request session ID |
| SF>RA request to send file | Send non-session data; New service |
| RA>RB>RI B channels connection | Non-session data request sent over |
| RI>VX | Send data on B channel |
| VX>RI>RB connection | Receive data on B channels |
| RB>AC application | Deliver non-session data to |
| AC>AF | New service request: Request to send file |
| AF>WIN>USER dialog box | Show user 'Request to send file' |
| USER>WIN>AF | User 'OK's receipt of file |
| AF>SF file | Notify service that we will receive |
| SF>RA connection | Estabilsh session over B channels |
| RA>RB>RI>VX network | Session connection message sent over |
| VX>RI>RB>RA session now up | Session connection request received, |
| RA>SF | Tell service that session is now up |

The following lines will occur for each block in the file to be sent.

| | |
|---|---|
| SF>RA | Request to receive block of file data |
| RA>RB>IR>VX channel | 'n' number of receives, for each 'B' |
| DISK>SF | Read block of data to be sent |
| SF>RA>RB | Request to send block of data in buffer |
| RB>RI>VX | 'n' send requests initated |
| SF>AF>WIN>USER file sent | Show user elapsed time, amount of |
| VX>RI>RB | 'n' sends completed (queued to be sent) |
| RB>SF be sent | Notify service that block is queued to |
| DISK>SF | Read block of data to be sent |
| | [Cycle to DISK>SF about 7 steps back] |
| VX>RI>RB | 'n' receives complete |
| RB>SF received | Notify service that a block of data was |
| SF>DISK | Write data block to disk |
| SF>RA | Request to receive block of file data |
| SF>AF>WIN>USER | [Cycle back to SF>RA at top] |
| DISK>SF therefor complete | Failure on disk read, file send is |
| SF>RA>RB | Request to drop connection |
| SF>RA>RB remote side | Send request to drop connection on |
| VX>RI>RB | Receive connection drop message |
| RB>RA>SF dropped | Tell service that connection has been |
| SF>DISK | Close file |
| SF>AF received | Notify application that file has been |
| AF>WIN>USER elapsed time | Notify user; send complete; show |
| SF>AF>WIN>USER elapsed time | Notify user that send is complete; show |

Sending A Message

| | |
|---|---|
| USER>WIN>AW>AM menu | User chooses Send Message from |
| AM>AC | Get status of current connection |
| AM>WIN>USER dialog box | Display Send Message Request |
| USER>WIN>AM | User enters message, chooses 'SEND' |
| AM>SM message | Application tells service to send |
| SM>RA (w/text) | Send non-session data: New message |
| RA>RB>RI channels connection | Non-session data request sent over B |
| RI>VX | Send data on B channel |
| VX>RI>RB connection | Receive data on B channels |
| RB>AC application | Deliver non-session data to |
| AC>AM | New message request (w/text) |
| AM>SM saves text | Tell service that message is in, SM |
| AM>SM to display | In foreground, retrieve message text |

-continued

| | |
|---|---|
| AM>WIN>USER | Display message for user to view |

Directory Structure

In the preferred embodiment, all Teleos software will be in its own directory (i.e. C:\B101\). This includes NETBIOS.EXE, BSTART.EXE, download files, etc.

Similarly, all HSDT related files will be in a separate directory (i.e. C:\WIN3\). The HSDT related files include:

PCTA.BAT - Load Teleos runtime software and load RTELEOS.EXE
RTELEOS.EXE - TSR to support VX module.
HSDT.EXE - High Speed ISDN Data Transfer software package.
NAMES.DAT - Names and Numbers database.
WIN.INI - Configuration information for HSDT.EXE

Vendor Layer Modules

In the preferred embodiment, the Teleos B101PC Terminal Adapter is the ISDN hardware. The code in the Vendor API Layer 50 will utilize the Teleos API for communicating with each TA. It will also present an interface to the Resource Management Layer 70 that is independent of the Teleos API. This will allow future versions of the software to make use of other hardware, such as DGM&S IDC.

Vendor Specific (VX) Module

Purpose:
Isolate vendor-specific code to a small piece of replaceable software. It will accomplish the following: send and receive on 'B' channels, X.25 sessions with another node, and voice control.

Description:
This module drives a specific vendor's ISDN (e.g. Basic Rate Interface) hardware. This implementation will drive Teleos B101PC TAs 24 through the ASK-100 API. It then presents to the Resource Management Layer 70 a standard interface such that a replacement of this module for another vendor will not require changes to the interface.

```
Data Structures:
typedef void                        VXT_Post //
Callback with VXM_messages
( void *xArgs, int msg,
    word wParam, long lParam);
typedef VXT——BStruct                *VXT_BHan;
typedef struct vxt_bstruct          VXT_BStruct;
typedef struct vxt_bstat            VXT_BStat;
struct vxt_bstruct
{
int         card
VXT_Post    *post,
void        *xArgs,
uint        flags,      // SEND or RECV _PEND/_CMPLT/_CLR
// Specific info needed to drive teleos interface
void        *sendP,     // Buffer pointers may not be needed
int         sendLen,
void        *recvP,
int         recvLen,
byte        sess,
VTT_Ncb     nSend,      // Sends to DPP, even start msgs
VTT_Ncb     nRecv,      // Receives from DPP
};
struct vxt_bstat
{
int         state       // VXC_NEEDINIT/_STARTED/
                        //   _ENDTOEND/_DISCON
struct vxt_card
{
                        // Voice/phone
                        // D channel and X.25
VXT_BStruct b[ 2];      // B channel info
};
Public Interface:
Prototypes for Whole card control functions:
int     VX_Setup(
            int cn):    // Card number (0 to VXK_NCARDS- 1)
int     VX_Cleanup)
            int cn):    // Card number
#if defined ( TCX_POLL)
int         VX_Poll(
            int cn):    // Card number
#else
#define     VX_Poll (cn):   // No Polling
#endif
int     VX_VAction(
            int cn,         // Card Number
            byte *dial,     // Null terminated string
            int button,     // 0=None, 1-63 CA/FEAT# OxFO-3 H,D,T,C
            int hook);      // 0=None, 1=On, 2=Off
Prototypes for 'B' channel control/send/recv functions
int     VX_BSetup(
            int         cn,     // Card number
```

```
                    -continued
          byte     ph[],    // Phone number to connect to
          uint     cap,     // Requested capability VXP_BC_any
          VXT_Post *postF,  // User post function
          void     *xArgs,  // User arguments to user post function
          VXT_BHan *bh);    // Rtn: handle on a 'b' channel
int  VX_BAccept (
          int      cn,      // Card number
          void     *inMsg,  // lparm from incall message indication
          VXT_Post *postF,  // User post function
          void     *xArgs,  // user arguments to user post function
          VXT_BHan *bh);    // Rtn: handle on a 'b' channel
int  VX_BReject(
          int      cn,      // Card number
          void     *inMsg,  // lParm from incall message indication
          int      reason); // User defined reject reason (0..63)
int  VX_BCleanup(
          VXT_BHan bH);     // Handle on the 'b' channel
int  VX_BSend(
          VXT_BHan bH,      // Handle on the 'b' channel
          int      len,     // Length of following buffer
          void     *buf);   // Points to user's buffer
int  VX_BRecv(
          VXT_BHan bH,      // Handle on the 'b' channel
          int      len,     // Length of following buffer
          void     *buf);   // Points to user's buffer
int  VX_BStatus(
          VXT_BH an bH,     // Handle on the 'b' channel
          VXT_BStat *s);    // Returns pointer to statistics/status
Prototypes: X channel control/send/recv functions
int  VX_XSetup(
          int      cn,      // Card number
          byte     ph[],    // X.25 address to connect to
          uint     cap,     // Requested capability
          VXT_Post *postF,  // User post function
          void     *xArgs,  // User arguments to user post function
          VXT_XHan *xH);    // Rtn: handle on a 'x' session
int  VX—XAccept(
          int      cn,      // Card number
          void     *inMsg,  // lParm from incall message indication
          VXT_Post *postF,  // User post function
          void     *xArgs,  // User arguments to user post function
          VXT_XHan *xH);    // Rtn: handle on a 'x' session
int  VX_XRegect(
          int      cn,      // Card number
          void     *inMsg,  // lParm from incall message indication
          int      reason): // User defined reject reason (0..63)
int  VX_XCleanup(
          VXT_XHan xH,      // Handle on the 'x' session .
int  VX_XSend(
          VXT_XHan xH,      // Handle on the 'x' session
          int      len,     // Length of following buffer
          void     *buf);   // Points to user's buffer
int  VX_XRecv(
          VXT_XHan xH,      // Handle on the 'x' session
          int      len      // Length of following buffer
          void     *buf);   // Points to user's buffer
int VX_XStatus(
          VXT_XHan xH       // Handle on the 'x' session
          VXT_XStat *s);    // Returns pointer to statistics/status
```

Vendor Specific Events

All events are delivered as messages with customized wParam and lParam values. See VXM_any defines and comments. The user's function must be prepared to be called from within an interrupt function (i.e. asynchronously). The xArgs parameter is defined by the user, and specified at the same time the callback function pointer was passed (see VX_Setup, VX_BAccept, VX_XSetup, VX_XAccept function params). Note, in the preferred embodiment, callback functions MUST NOT make calls to the VX interface that result in a WAIT mode request, or that make DOS calls (these are: Setup, Cleanup and Accept functions).

```
void_far VX_Callback(
     void  *xArgs,   // User arguments are passed back to user
```

```
                  -continued
     int   msg,      // The message; VXM_any
     word  wParam,   // Single word argument; message specific
     long  lParam);  // Single long argument; message specific
B messages:
VXM_BCALL          Received after VX_Setup( ).
                   Indicates that an incoming 'b'
                   channel connection request was
                   received from the ISDN network.
                   wParam is the card number.
                   lParam contains a vendor specific
                   value that must be returned to
                   VX_BAccept( ) or
                   VX_BReject( ) commands in the
                   imMsg parameter field.
X messages:
VXM_XCALL          Received after VX_Setup( ).
                   Indicates that an incoming 'x'
                   session connection request was
                   received from the ISDN network.
```

|  |  |
|---|---|
|  | wParam is the card number. 1Param contains a vendor specific value that must be returned to VX_XAccept( ) or VX_XReject( ) commands in the 'imMsg' parameter field. |
| Voice messages: |  |
| VXM_VHOOK | Generated whenever a change is detected in Hook state (phone on or off hook) wParam: new hook state 1=on; 2=off 1Param: OL |
| VXM_VSCA | Generated whenever a change is detected in Selected call appearance wParam: new sca; 1Param OL |
| VXM_VCA | Generated whenever a change is detected in Call/feature buttons wParam: 0; 1Param: byte ca_stat [64] |
| VXM_VINFO | Teleos level struct indications, per wParam: |
|     VXW_STAT_IND | Status indication. 1 Param: VTT_V_StatInd _far * |
|     VXW_INFO_Ind | Info indication. 1Param: VTT_V_InfoInd _far * |
| VXM_VST_CA | Change in state of call Appearance wParam: ca#; 1Param:state (per CCITT Q.931) |
| VXM_VST_FEAT | Change in state of Feature Appearance wParam: button#; 1Param:state (per CCITT Q.931) |
| VXM_VPROG | Progress indicator. wParam: pi# (per CCITT Q.931); 1Param: 0 |
| VXM_VCAUSE | Cause code. wParam: cause# (per CCITT Q.931); 1Param: 0 |
| VXM_VDISP_CONTEXT | Preceeds display items. wParam: ca#; 1Param: mode (per AT&T 5ESS spec) |
| VXM_VDISP_ITEM | Display items (per CONTEXT). wParam: type (per AT&T 5ESS spec); 1Param: char _far *text; |
| B messages: |  |
| VXM_BSEND | Received after VX_BSend( ). User must not disturb the send buffer until this message is received. This message means that the send-buffer data has been queued to be sent. It does not means that the data has actually been delivered. wParam and 1Param are both zero. |
| VXM_BRECV | Received after VX_BRecv( ). Unless the VX_Brecv( ) command is given, no data will be received on this channel. This command allows the VX module to make a request to receive. The buffer must not be disturbed until this message is received. This message is an indication that the receive request is complete and the receive buffer contains data. The actual length of received data must be determined through a VX_BStatus( ) call. Both wParam and 1Param are zero. |
| VXM_ENDEND | Received after VX_BSetup( ) or VX_BAccept( ). This message indicates that an end-to-end connection exists, but the DPP process to maintain an actual data channel connection is not yet present for this 'b' channel. User may not not yet perform VX_BSend( ) and VX_BRecv( ) commands. The DPP may take up to seven seconds to be started. Both wParam and 1Param are zero. |
| VXM_BCONN | Received after VX_ENDTOEND message. This message indicates that a complete connection (end-to-end as well as a DPP process to maintain actual data channel connection) is now present for this 'b' channel. User may now perform VX_BSend( ) and VX_BRecv( ) commands. Both wParam and 1Param are zero. |
| VXM_BFAIL | Received only on a 'b' channel that has not yet been VXM_BCONNected. wParam gives the reaon (VXU_any). 1Param is zero. User must eventually call VX_BCleanup( ) to free up the resources allocated to this channel. |
| VXM_BDISCON | Received only on an existing 'b' channel that has been VXM_BCONNected. wParam gives the reason (VXU_any). 1Param is zero. User must eventually call VX_BCleanup( ) to free up the resources allocated to this channel. |
| X messages: |  |
| Messages posted to postF in VX_XSetup( ): |  |
| VXM_XSENT | Received after VX_XSend( ). Only one send may be pending per X25 interface (i.e. per card). wParam: 0 or Vendor error; 1Param: xH |
| VXM_XRECV | Data has been received on an established link; wParam: length (0..VXK_MAX_XDATA); 1Param: Data pointer |
| VXM_XREADY | Received after VX_XSetup ( ) and during VX_XAccept( ). Indicates link is established. User may now perform VX_XSend( ) and VX_XRecv( ) commands. wParam: sess#; 1Param: xH |
| VXM_XFAIL | Received only on initiating side, before XREADY message wParam: cause (per CCITT X.25 rec.); 1Param: xH |
| VXM_XDISCON | Received only after VXM_XREADY on established link. wParam: cause (per CCITT X.25 rec.) 0=normal; 1Param: xH |

Resource Management Layer Modules

To support the Service Layer 80, the ISDN lines 26 must be managed (linked and synchronized) as a shared resource. Thus, the 'B' channels are managed as a resource, to ensure a cooperative use of ISDN hardware. Features of the Resource Management Layer 70 include:

call setup for a Voice connection without interrupting an existing logical connection. Once a voice connection is established, a voice features service can be attached to it; and call setup for a Data connection by specifying a bandwidth allocation and a main phone number. This layer must deal with the detail of dialing various phone numbers associated with more than one BRI line 26 at each site. Once this logical connection is established, the Resource Layer 70 must allow several services to connect with its resource counterpart, on this single connection.

Asynchronous events, as described in greater detail above, must be routed to the application so that it may define the method for dealing with asynchronous activity within its defined user interface environment. Each event should be associated with its respective data or voice connection. Future capabilities might allow for an X.25 type connection to the remote station at the Application/Service Layer.

ISDN Configuration Management (RI) Module

Purpose:

Presents to rest of layer: Some number of 'B' channels, Voice control of a single phone, and X.25 connection with another node (id: data path to another node with out use of a 'B' channel)

Description:

Supports these actions:
 Bandwidth allocation/connection;
 Availability and status;
 Voice capability;
 Network messages;
 Negotiation (Allow discussion with other side)

Isolates rest of code from knowing:
 Which D channel goes with which B channel;
 Keeping a voice channel open where possible;
 Where Phone is (which device its plugged into);
 Specific card's phone numbers locally and remotely;
 Nature of an X.25 session;
 Matching similar B channel capabilities with remote side;

```
Data Structure:
struct rit_bstruct
{
byte            crx;        //Centrex prefix
char            ph [ RIK_PH_LEN];
int             state;      // UP/DOWN/Other
struct rit_ustruct
{
int             ra;
char            rPh [ RIK_PH_LEN];
int             state;
int             err;        // XV error within post funcs
RIT_Post _far   *postF;     // Callback function pointer
void    _far    *xArgs;     // Callback user args
int             rLen;       // Recv length (for restarts)
VXT_BRecv_far   *rBuf;      // Recv buffer (for restarts)
int             cn;         // Card number
RIT_BStruct/far *bs;        // Points to B struct
VXT_BHan        bH;         // Vendor layer handle
};
struct rit_card
{
int             cn;         // Card number
RIT_BStruct     b [ RIK_BPERC];
};
struct rit_xtalk
{
HANDLE          xtH;        // Windows handle to this
                                struct
HANDLE          nextH;      // Windows handle to next
                                struct to send
char            ph          // Address to send data to
                                [RIK_PH_LEN];
int             len;        // Length of user data
byte            buf         // Malloced area for data
                                [ 2];
};
struct rit_xstruct  // Information to manage X25
                        send/recv
{
int             state;      // IDLE/READY/START/
                                ACCPT/ExpectACCPT
int             len;        // Total length
int             sLen;       // Length sent so far
VXT_XHan        h;          // Handle on Vendor layer x25
int             err;        // Final errors if any
struct rit_ri
{
RIT_Card        c [ RIK_NCARDS_MAX];
RIT_UStruct     u [ RIK_UCHANS_MAX];
int             nC;         // Number of cards (from setup)
int             nU;         // Number of user channels
                                2*ncards?
RIT_Post _far   *postF;
void    _far    *XArgs;
int             state;      // State of module
                            // X.25 Session control
RIT_XStruct     xS;         // Send on x25
RIT_XStruct     xR;         // Receive on x25
RIT_XTalk _far  *xtS;       // Que of x25 messages to be
                                sent
int             xLen;       // Size of receive buffer
byte    _far    *xBuf;      // Buffer for receiving an x25
};
Public Interface:
Return values:
RIE_ALLOC       // Could not allocate needed memory
RIE_NOBCHAN     // No 'B' chans available
RIE_NOBCHAN     // Connection is down or invalid handle
int RI_Setup(   //Initialize the ISDN hardware and this module
                // Number of cards
                // Local phone number for each 'B' chan per card
                // # X sessions (# listening and # total)
                // Buffer area for each X receive
int RI_XSend(   // Send X data (data-gram sent using X
                    sessions)
                // Phone number
                // Length of data to send
                // Pointer to data
int RI_Alloc(   // Allocate 'B' chan
                // Rate adaptation (RIP_Rany (64R, 64UR, 56UR)
                // CallBack func for this connection
                // User args
                // Rtn: Handle on 'B' chan (Hb)
int RI_ReAlloc( // Reallocate resources (change rate adapt.)
                // Handle on 'B' chan (Hb)
                // New rate adaptation (RIP_Rany (64R, 64UR,
                    56UR)
int RI_Conn(    Request connection to remote 'B' chan
                // Handle on 'B' chan (Hb)
                // Phone number
int RI_Close(   // Close a conenction, dealloc resources
                // Handle on 'B' chan (Hb)
int RI_Stat(    // Retrieve statistics on a connection
                // Handle on 'B' chan (Hb)
                // Rtn: phone number
                // Rtn: remote phone number connected to
                // Rtn: Rate adapt, etc.
int RI_Send(    // Send data across a bandwidth connection
                // Handle on 'B' chan (Hb)
                // Length of data to send
                // Pointer to data buffer
int RI_Recv(    // Start async receive request
                // Handle on 'B' chan (Hb)
                // Length of destination buffer
                // Pointer to destination buffer
Resource Management Layer Events:
RIM_XDATA       // Received X data (w/buffer number)
RIM_VOICECHG    // Change in voice state (w/new state vals)
RIM_START       // Starting 'B' chan connect
RIM_READY       // Connection connected, ready to
                    send/recv
RIM_DOWN        // Connection is down (w/reason)
RIM_RECV        // Data 'receive' completed on 'B' chan
RIM_SENT        // Data 'send' completed on 'B' chan
```

Bandwidth Allocation (RB) Module

Purpose:
 The RB module manages groups of B channels to be presented to the HSDT software as a single logical connection.

```
Data Structures:
struct rbt_pipe
{
int             state;      // Control on per 'pipe' basis
byte            bufs        // Send/Recv pipe buffers
                            [ RBK_B_MAX] // For each 'b' channel
                                              in bandwidth
                            [ size of { RBT_RIsr];
};
struct rbt_con
{
int             nB;         // Number of 'B' channels in
```

|  |  |  |
|---|---|---|
| int | ra; | // Rate adaptation |
| int | nSb; | // Number of SEND buffer sets (pipes) |
| int | nRb; | // Number of RECV buffer sets (pipes) |
| int | bSz; | // Size of a B chan buffer |
| RBT_Post _far | *postF; | // User post func |
| void _far | *xArgs; | // User args |
| int | state; | // State of connection |
| int | err; | // Error from lower layers |
| int | eB; | // 'B' channel with lower layer error |
| unsigned | upF; | // Bit flags: 'B' chans that are up and ready |
| unsigned | sF; | // Bit flags: 'B' chans that completed 'send' |
| unsigned | rF; | // Bit flags: 'B' chans that completed 'recv' |
| QU_WDStruct( rbt_que, int) | | |
| | q; | // Que of pipes that are ready to be sent |
| int | sState; | // Send state |
| int | rState; | // Recv state |
| HANDLE | sH; | // Windows HANDLE on sP |
| RBT_Pipe _far | *sP; | // Points to array of 'pipe's (SEND) |
| HANDLE | rH; | // Windows HANDLE on rP |
| RBT_Pipe _far | *rP; | // 'pipe's (RECV) |
| int | pS; | // Pipe number that is SENDING |
| int | pR; | // Pipe number that is RECVING |
| RIT_UHan | uH | // RI layer handles [ RBI_B_MAX]; |
| struct rbt_args | | // xArgs sent to RI layer for RB callback |
| { | | |
| int | b; | // 'B' channel number |
| RBT_CHan | cH; | // Points back to master RBT_Con struct |
| ] | args | // xArgs to RI layer [ RBK_B_MAX]; |
| }; | | |

Public Interface:
Return values:
RBE_ALLOC      // Could not allocate needed memory
RBE_BCHANS     // Not enough 'B' chans available
RBE_DOWN       // Connection is down or invalid handle
RBE_NODATA     // Receive buffer has no data
Functions:
int RB_Alloc(   // Allocate connection resources
    // Bandwidth (# of 'B' chans)
    // Rate adaptation (RBP_Rany (64R, 64UR, 56UR)
    // CallBack func for this connection
    // User args
    // # of send buffers
    // # of recv buffers
    // Size of one 'B' chan buffer
    // Rtn: Handle on connection (Hc)
int RB_ReAlloc(  // Reallocate resources (Drop/add 'B' chans)
    // Handle on connection (Hc)
    // New bandwidth (# 'B' chans)
    // New rate adaptation (RBP_Rany (64R, 64UR, 56UR)
int RB_Conn(    // Request connection to many 'B' channels
    // Handle on connection (Hc)
    // List of Phone numbers, one for each 'B' chan
int RB_Close(   // Close a connection, dealloc resources
    // Handle on connection (Hc)
int RB_Stat(    //Retrieve statistics on a connection
    // Handle on connection (Hc)
    // Rtn: list of phone numbers, one for each 'B' chan
    // Rtn: list of remote phone numbers connected to
    // Rtn: number of 'B' chans, Rate adapt, etc.
int RB_Send(    // Send data across a bandwidth connection
    // Handle on connection (Hc)
    // Length of data to send
    // Pointer to data buffer
int RB_GetData( // Retrieve data that is waiting in a buffer
    // Handle on connection (Hc)
    // Handle on source buffer for connection (from RBM_RECV msg)
    // Length of destination buffer
    // Pointer to destination buffer Events:
| RBM_START | | // Starting to build 'B' chan connections |
|---|---|---|
| RMB_READY | | // Connection connected, ready to send/recv |
| RBM_DOWN | | // Connection is down (w/reason) |
| // RBM_RECV/_SENT | | give handle on connection + buffer handle |
| RBM_RECV | | // Data was received on bandwidth connection |
| RBM_SENT | | // Data was sent |

Application Interface (RA) Module

Description:
Provides an interface to service applications:
  Voice connection;
  Voice commands;
  Status/Equipment list;
  Data connection;
  Data send/receive (Block or message);
  Network messages (Asynchronous);
  Establish multiple sessions over same data connections;
Accomplishes the following:
Allows multiple sessions over dame data connection;
Synchronize requests from more than one application/service (or instance of such);
Sharing of ISDN resources;
Delivery of network messages to correct applications;

Data Structures:
| struct rat_coreq | | // Structures send across the X25 link |
|---|---|---|
| { t; | | // Type: RAC_XT_REQ/REJ/ACK |
| int | co; | // Connection number to respond to |
| int | sync; | // To match REQ/ACK/REJ pairs |
| char | ph[ RAK_PH_LEN]; | // Phone number to call back on |
| char | nm[ RAK_NM_LEN]; | // Name of remote application |
| int | ra; | // Suggested rate adaptation |
| int | bw; | // Suggested number of channels |
| char | bPr[ PAK_BPR_LEN]; | // B-Chan trunc access prefix |
| char | coPh[ RAK_BPERCO] [RAK_PH_LEN]; | // Numbers for each chan |
| int | len; | // Length of request message |
| char | data[ RAK_TDATA_LEN]; | // User request message |
| }; | | |
| struct rat_se | | |
| { | | |
| RAT_Post _far | *postF; | // Call back function |
| void _far | *xArgs; | // Call back user args |
| int | state; | // Up/Down/Free/Other |
| byte | rSe; | // 'Return' session number to remote |
| byte | co; | // Index to associated CONNECTION struct |
| byte | sync; | // For matching sessions on each end |
| struct rat_co | | |
| { | | |
| RAT_Post _far | *postF; | // Callback |
| void _far | *xArgs; | // Callback user args |
| char | rPh[ RAK_PH_LEN]; | // Remote phone that we're connected to |
| int | state; | // Up/Down/Errored/Waiting/Other |
| int | sync; | // To match REQ/ACK/REJ pairs |
| HANDLE | reqH; | // Saved request struct HANDLE |

```
RAT_CoReq _far    *req;           // Saved request struct til
                                     ACK/REJ
RAT_Sb sb[ RAK_NPIPES];           // Send buffer stats
RBT_CHan          hRB;            // RB Module handle
};
struct rat_ap
{
char nm[ RAK_NM_LEN];             // Application name
RAT_Post _far     *postF;         // Post function
void      _far    *xArgs;         // Post user args
int               state;          // Free/Inuse
};
struct rat_ra
{
int    state;
char cxBufR[ RAK_XLEN];           // X.25 buffer for RI recvs
RAT_Ap    ap[ RAK_NAPPS];         // Applicaton structs
RAT_Co    co[ RAK_NCONS];         // Connection structs
RAT_Se    se[ RAK_NSESS];         // Session structs
int               sync;           // Synchronizing value
};
```

Public Interface:
Return Values:
RAE_ALLOC         // Could not allocate needed memory
RAE_NOBCHAN       // No 'B' chans available for connection
RAE_CODOWN        // Connection is down or invaild handle
RAE_SEDOWN        // Session is down or invalid handle Setup/Registration Functions:
int RA_Setup(     // Initialize the ISDN hardware and this module
        // Number of cards
        // Local phone number for each 'B' chan per card
        // Indication of whether to deal with voice messages
Int RA_AppReg(    // Register application by name
        // Name of application
        // Callback func for connection requests
        // User args
        // Rgn: Handle for this application (Ha)
int RA-AppDereg(  // De-register the application
        // Handle for this application (Ha)
int RA_Cleanup(   // Un-init the module (and hence the ISDN hardware)
        // no parameters Connection oriented functions:
int RA_CoReq(     // Request connection to remote application
        // Handle for this application (Ha)
        // Main phone number of remote application
        // Name of remote application
        // Length of user data
        // User data (application defined request message)
        // Suggested Rate adaptation (RAP_Rany (64R, 64UR, 56UR)
        // Suggested number of 'B' chans (bandwidth)
        // CallBack func for this connection
        // User args
        // Rgn: Handle on connection (Hc)
int RA-CoAckReq(  // Acknowledge connection to remote application
        // Handle for this application (Ha)
        // Param from RAM_COREQ message
        // Final Rate adaptation (RAP_Rany (64R, 64UR, 56UR)
        // Final number of 'B' chans (bandwidth)
        // CallBack func for this connection
        // User args
        // Rtn: Handle on connection (Hc)
int RA_CoRejReq(  // Reject a connection to remote application
        // Handle for this application (Ha)
        // Param from RAM_COREQ message
        // reason
        // Length of user data
        // User data (application defined reject message)
int RA_CoClose(   // Close a connection, dealloc resources
        // Handle on connection (Hc)
int RA_CoStat(    // Retrieve statistics on a connection
        // Handle on connection (Hc)
        // Rtn: local phone number
        // Rtn: remote phone number connected to
        // RTN: Rate adapt, # 'B' chans, connected state, etc.
int RA_CoSend(    // Send data across a connection w/o session ID
        // Handle on connection (Hc)
        // Length of data to send
        // Pointer to data buffer
        // Rtn: actual length of data that was buffered to be sent
int RA_CoGetData( // Retrieve incoming non-session data
        // Param from RAM_CORECV message
        // Length of destination buffer
        // Pointer to destination buffer
        // Rtn: actual length of received data Session oriented functions:
int RA_SeReq(     // Request connection to remote application
        // Handle for this application (Ha)
        // Length of user data
        // User data (application defined request message)
        // CallBack func for this session
        // User args
        // Rtn: Handle on session (Hs)
int RA_SeAckReq(  Acknowledge request for connection
        // Handle for this session (Hs)
        // Param from RAM_SEREQ message
        // CallBack func for this connection
        // User args
        // Rtn: Handle on session (Hs)
int RA_SeRejReq(  Reject connection to remote application
        // Handle for this session (Hs)
        // Param from RAM_SEREQ message
        // reason
        // Length of user data
        // User data (application defined reject message)
int RA_SeClose(   // Dispose of session ID within a connection
        // Handle for this sessin (Hs)
int RA_SeSend(    // Send data across a connection using a session ID
        // Handle for this session (Hs)
        // Length of data to send
        // Pointer to data buffer
        // Rtn: actual length of data that was buffered to be sent
int RA_SeGetData( // Retrieve incoming session data
        // Handle for this session (Hs)
        // Length of destination buffer
        // Pointer to destination buffer
        // Rtn: actual length of received data Events:
RAM_COREQ       // Request for connection from remote side
RAM_COACK       // Received acknowledgement, starting to connect
RAM_COREJ       // Received rejection (w/reason)
RAM_COREADY     // Connection ready to send/recv
RAM_CODOWN      // Connection is down (w/reason)
RAM_CORECV      // Non-session data has been received
RAM_COSENT      // Non-session data has been sent
RAM_SEREQ       // Request for session coming from remote side
RAM_SEACK       // Received acknowledgment, starting to connect
RAM_SEREJ       // Received rejection (w/reason)
RAM_SEREADY     // Session ready to send/recv (remote connected)
RAM_SEDOWN      // Session is down (w/reason)
RAM_SERECV      // Session data has been received
RAM_SESENT      // Session data has been sent

Service Layer Modules

The Service Layer 80 is made up of a plurality of actal 'services' modules that can be mixed and matched for the specific application, where the HSDT software, being implemented. These services should be written to take advantage of the Resource Management Layer 70 for the cooperative use of the ISDN hardware. Services should also be written to allow several instances of themselves to exist where more than one application may be running, or more than one instance of a service may be required by a single application.

In the preferred embodiment, each service is actually written in two parts which are the 'initiating' and 'responding' sides of a logical connection between the same service on each side of the connection. This client-/server model will dominate a description of each of the services to follow.

File Transfer (SF)

Purpose:

The SF module performs the File transfer function through utilization of the Resource Management Layer 70.

Description:

Using a file name and a reference to an established data connection, performs a transfer negotiation phase where each subscriber station 12 must agree between themselves that the transfer is to take place and after exchanging some statistics about the size of the file and anticipated duration the transfer is allowed to proceed as described in greater detail. A high speed disk intensive file transfer algorithm will transfer blocks of the file to the realization of the full bandwidth available on the given logical connection. Ongoing progress of the transfer process will be made available to the HSDT software.

Data Structures:
```
struct sft_srv
{
// Given by user
char            file [ SFK_FILE_LEN];
SFT_Post _far   *post F;    // Callback
dword           xArgs;      // Callback user args
int             pipes;      // Number of RB Module pipes to
                            //   fill
int             block;      // Size of RA Send blocks per
                            //   channel
int             ackCnt;     // Acknowledge counter for
                            //   handshaking
// Calculated once
int             bw;         // Bandwidth in # channels
long            fLen;       // Length of file
int             io;         // File handle after open ( )
clock_t         sTicks;     // Start ticks value
                            // Forever changing
int             state;      // Sending/Wait for ACK/Done/
                            //   Abort
int             blkCnt;     // Number of blocks sent/recved
long            aLen;       // Active length (recv/sent so
                            //   far)
int             pFree;      // Number of free send pipes
clock_t         fTicks;     // Final ticks value
                            // Misc handles on stuff
HANDLE          fHH;        // Windows handle on open file
RAT_SeHan       seH;        // Resource layer session
                            //   handle
                // Disk buffer management
HANDLE          dHan;       // Windows handle
SFT_DPtr _far   *dPtr;      // Locked pointer
int             dTran;      // Disk transfer size
int             dPipe;      // Size of a pipe
int             dDate;      // Amount of data bytes
                            //   currently in buf
byte  _far      *dAvail;    // Points to avail space
                            //   (dPtr+dData)
int             dEOF;       // Flag that end of file was
                            //   reached
};
struct sft_req
{
byte            srvId;      // User defined service ID to
                            //   link SERVICES
char            file[ SFK_FILE_LEN];
int             block;      // Size of one block
int             ackCnt;     // Acknowledge counter
long            fLen;       // File length
long            ticks;      // Estimated 1000ths of seconds
int             kbps;       // Bandwidth
int             bLen;       // Length of following buffer
char            buf[ 2];    // Must pad with user's real
                            //   length
};
```

Reasons for rejection:
```
SFP_RSIZE       // File is too big to save on local disk
SFT_RTIME       // Send will require too much time
SFT_RMONEY      // Cannot afford to do send this time of day
SFT_RCOPY       // Already have a copy of this file
SFT_RDAY        // Would like to receive file later in day
SFT_RWEEK       // Would like to receive file later in week
SFT_RMONTH      // Would like to receive file later in month
SFT_RNUMBER     // Number of files being sent is too much
SFT_RNEWER      // Would like a newer version / mine is
                //   newer
SFT_RNONE       // No particular reason
```

Public Interface:
```
int SF_SendReq(     // Make a request to send a file
                    // Handle on a connection (Hc)
                    // Name of file to be sent
                    // Callback function to receive statistics
                    // User args
                    // Rtn: Handle on the file send service (Hf)
int SF_AckSendReq(  // Acknowledge request to send a file
                    // Param from RAM_SEREQ message
                    // Name of file on local disk to be created
                    // Callback function to receive statistics
                    // User args
                    // Rtn: Handle on the file send service (Hf)
int SF_RejSenReq(   // Reject request from remote to send a
file
                    // Param from RAM_SEREQ message
                    // reason (SFP_Nany)
int SF_Abort(       // Stop sending the file, destroy the
service
                    // Handle on the file send service (Hf)
int SF_Stat(        // Retrieve statistics on file send
                    // Handle on the file send service (Hf)
                    // Rtn: length of file, file name
                    // Rtn: remote's phone number
                    // Rtn: amount of file sent so far
                    // Rtn: elapsed time so far, estimated total time
                    //   to send
```

File Transfer Events:
```
SFM_ACK             // Service acknowledged, beginning send
SFM_REJ             // Send was rejected by remote
 (w/reason)
SFM_ABORT           // Remote aborted (w/reason)
SFM_ERROR           // Low level error on session, service
gone
SFM_END             // End of file, service is now gone
```

Message Send (SM) Module

Purpose:

The SM module performs messaging functions through utilization of the Resource Management Layer 70.

Description:

In an ad-hoc manner, a single buffer of text is sent from a first subscriber station 12 over an established logical connection and appears in a buffer on a second subscriber station 12'. By polling or by an asynchronous message, the HSDT software receives this buffer of text. Int he preferred embodiment, this process can take place even during a file transfer on the same logical connection.

Public Interface:

```
Return values:
SMR_OK          // No error
SMR_NOMSG       // There is no message text to be retrieved
SMR_GETMSG      // There is message text that needs retrieving
Functions:
int SM_SendMsg(    // Send a message to a remote application
                   // Handle on a connection (Hc)
                   // Length of message
                   // Pointer to message
int SM_Event(      // Handle incoming SM module
RAM_SEREQ message
                   // Param from RAM_SEREQ message
                   // Rtn: Handle used to retrieve message text (Hm)
int SM_GetMsg(     // Retrieve received message text
                   // Handle used to retrieve message text (Hm)
                   // Rtn; length of message
                   // Rtn: Remote's phone number
                   // Rtn: message text
```

Message Send Events

None.

Voice (SV) Module

Purpose:
Perform voice functions through utilization of the Resource Layer 70.

Description:
Physical use of an analog phone attached to the PC's ISDN card causes events to occur in software which inform this service of the current hook and voice state of the phone. These events are passed up to the Application Layer 50 for processing.

```
Data Structures:
None required.
Public Interface:
void FAR SV_Event(
DWORD dsUserArg,        // User arguments to be
 passed
int iMsg,               // Event message
WORD wParam,            // Additional event
 information
long lParam);           // Additional event
 information
Events:
RAM_VHOOK               //Phone went physically on/off
 hook
RAM_VSCA                //ISDN selected call appearance
 changed
RAM_VST_CA              //ISDN call appearance state
 changed
RAM_VST_FEAT            //ISDN feature appearance state
 changed
RAM_VDISP_CONTEXT       //Context in which to display text
 items
RAM_VDISP_ITEM          //Text items to be displayed
```

Database Layer Modules

These modules allow access to ISDN type databases. In the preferred embodiment, only a Name and Phone number database is being utilized.

Name and Number (DN)

Purpose:
The DN module allows access to a list of Names and Numbers, either by returning a Name given a number, or returning a list of all names and numbers.

Description:
Sometimes the HSDT software requires the Name associated with an incoming number. Other times a list is needed of all possible Names that can be called, so the user can choose one. This module retrieves this information from a disk file that has been built before running the software.

```
Data Structures:
struct DNS_NAMENUM
{
char cName[DNC_MAX_NAME];    // Name of person /
                              station
char cNum[DNC_MAC_NUM];      // Phone number
};
Public Interface:
Field Sized:
# define    DNC_MAX_NAME    64
# define    DNC_MAX_NUM     16
Return Values:
# define    DNR_NOERROR     0
# define    DNR_NONUM       (-1)
# define    DNR_NOMORE      (-2)
int DNN_GetName( // find a name for the given number
    char *sNum,     // passed: number to use to locate name
    char *sName);   // return: name associated with number
int DN_GetFirst(    // get first name & number entry in
    database
    char *sNum,     // return: number of first entry
    char *sName);   // return: name of first entry
int DN_GetNext(     // get next name & number entry in
    database
    char *sNum,     // return: number of next entry
    char *sName);   // return: name of next entry
```

Name and Number Events

None.

Application Layer Modules

The core of the HSDT software is written in a manner such that it is independent of any particular user interface. This allows for multiple instances of services to run simultaneously from several applications. These applications may run in a number of environments, including Microsoft Windows, DESQview, DOS TSR, etc.

As previously noted, the HSDT software utilizes Microsoft Windows. This application allows the use of all of the existing services in different windows. Each of the capabilities (Call Setup, File Transfer, Messaging, Voice) exist in separate windows.

As described in greater detail above, each of the features exist in their own child window with appropriate edit prompts and dialog box controls.

Windows Main (AW) Module

Purpose:
The AW module provides program initialization functions and process messages for the main program window.

Description:
As known, any program that runs under the Microsoft Windows environment is required to be structured differently from a traditional 'C' program. One difference is that the required function is called WinMain() instead of main(). Also, Windows applications must make use of the message-based architecture of execution instead of traditional top-down programming.

```
Data Structures:
extern HANDLE g_hInst;      // handle to program instance
extern HWND g_hFrameWnd;    // handle to frame window
extern HWND g_hClientWnd;   // handle to MDI client
```

```
extern HANDLE g_hAccTable;      // handle to accelerator table
extern WORD g_wOptions;         // automatic options
extern char g_sIniFileName[ ];  // HDST init file pathname
```
Public Interface:
```
int PASCAL WinMain(             // program entry point
HANDLE hInstance,               // handle to this program
  instance
HANDLE hPrevInstance,           // handle to prev program
  instance
LPSTR lpCmdLine,                // command line string
int nCmdShow);                  // how to initially display
  program
long FAR PASCAL AW_WndProc(     // message processor for
  main window
HWND hWnd,                      // handle to window getting
  message
unsigned message,               // message being sent
WORD wParam,                    // information about message
LONG lParam);                   // more information about
  message
```
Windows Main Events:
```
#define IDM_SRVCSETUP        1001  // services menu items
#define IDM_SRVCSENDFILE     1002
#define IDM_SRVCSENDMSG      1003
#define IDM_SRVCCHATMODE     1004
#define IDM_SRVCDEBUG        1005
#define IDM_SRVCEXIT         1006
#define IDM_SRVCSENDSCREEN   1007
#define IDM_SRVCVOICE        1008
#define IDM_OPTSAUTOANS      2001  // options menu items
#define IDM_OPTSAUTORCV      2002
#define IDM_OPTSRTNRCPT      2003
#define IDM_OPTSDENYMSG      2004
#define IDM_OPTSDENYCHAT     2005
#define IDM_OPTSSAVE         2006
#define IDM_WINDCASC         3001  // window menu items
#define IDM_WINDTILE         3002
#define IDM_WINDARNG         3003
#define IDM_WINDCHILD        3100  // id of first child window
#define IDM_HELPHELP         4001  // help menu items
#define IDM_HELPINDEX        4002
#define IDM_HELPABOUT        4003
#define IDM_INITISDN         5001  // internal message ids
```

ISDN Interface (AI) Module

Purpose:

The AI module serves to provide access to all necessary ISDN functions from the application.

Description:

This module provides all the needed functions so that the HSDT software may accomplish any task that requires ISDN activity. It includes a function which will be called from the Resource Management Layer 70 to deliver information about ISDN activity.

Data Structures:
```
extern RAT_ApHan g_hAppHnd;     // RA Layer application handle
```
Public Interface:
```
BOOL AI_Setup(                  // Setup ISDN stuff
int iNumCards,                  // number of ISDN BRI cards
char *sPhones);                 // phone number for each B channel
BOOL AI_Cleanup(                // Cleanup ISDN stuff
void);                          // no parameters
BOOL AI_Event(                  // Callback function for RA
WORD wParam);                   // event to process
```

ISDN Interface Events

The detail of these messages processed from the network are included in the header file (e.g. RA.H).

Call Connection (AC) Module

Purpose:

The AC module serves to provide services for the user to establish and drop connections and to view the status of the current connections. Also, the module serves to process messages for connection-related events.

Description:

The user may at times wish to view the current status of all connections, as well as establish or terminate. This module provides functions to allow the user to see and manipulate this information. It also keeps track of connection activity messages from the network to keep the display to the user current.

Data Structures:
```
struct ACS_COON_DATA            //Information for a connection window
{
int    iNnDdIdx;                // current names and numbers
                                    database index
HWND   hActCtrl;                // handle of active child window
                                    control
RAT_CoHan xConnHdl;             // RA handle for this connection
HWND   hXferWnd;                // handle to file transfer window
HWND   hChatWnd;                // handle to chat window
HWND   hClidBox;                // handle to call identification
                                    group box
HWND   hNumEdit;                // handle to number edit field
HWND   hNameText;               // handle to name text field
char   szNum[DNC_MAC_NUM];      // stripped call identifi-
                                    cation number
char   szDNum[DNC_MAX_NUM];     // stripped call D channel
                                    prefix
char   szBNum[DNC_MAX_NUM];     // stripped call B channel
                                    prefix
HWND   hChanBox;                // handle to channel information
                                    group box
HWND   hAllBtn;                 // handle to all channels button
HWND   hOnlyBtn;                // handle to only use button
HWND   hOnlyFld;                // handle to number of channels
                                    edit field
int    iChans;                  // how many channels to use
HWND   hStatBox;                // handle to status message group
                                    box
HWND   hStatText;               // handle to status message
HWND   hConnBtn;                // handle to connect button
HWND   hDiscBtn;                // handle to disconnect button
HWND   hAcptBtn;                // handle to accept button
HWND   hRejtBtn;                // handle to reject button
HWND   hDdirBtn;                // handle to dialing directory
                                    button
HWND   hCancBtn;                // handle to cancel button
```
Public interface:
```
long FAR PASCAL AC_WndProc(     // message processor for
  connect window
HWND hWnd,                      // handle to window getting
  message
unsigned message,               // message being sent
WORD wParam,                    // information about message
LONG lParam);                   // more information about
  message
int AC_Setup(                   // Setup a connection, return
  handle
int iNumCards,                  // number of ISDN BRI cards
char *sPhones);                 // phone number for each B
  channel
int AC_GetStats(                // Get statistics on a connection
int iHandle,                    // connection handle
WORD WParam);                   // information on connection
BOOL AC_Event(                  // Callback function for RA
```

```
WORD wParam);        // event to process
```

Call Connection Events

The details of these messages processed from network are included in a header file (e.g. RA.H). Also included are messages processed from user, such as Accept, Deny, Request, etc.

File Transfer (AF) Module

Purpose:
The AF module serves to provide services for transmitting files to a subscriber station and receiving files from other subscriber stations. The module also serves to process file transfer-related messages.

Description:
The primary activity once a connection is established is to transmit a file from one station to another. This module provides access to the send file services.

```
Dat Structures:
struct AFS_XFER_INFO  // Information about a file
                      transfer process
{
int       iStatus;         // Transfer status
HWND      hConnWnd;        // Connection Window
RAT_CoHan xConnHdl;        // RA layer connection
long      lXferTicks;      // Time to transfer file
long      lElapsedTicks;   // Time so far
long      lRate;           // On-going xfer rate
int       iBandWidth;      // Number of channels
long      lFileLen;        // Total length of file
long      lBytesSoFar;     // Length of file sent so far
HWND      hTinfoBox;       // Handles on windows boxes/
                              text/buttons
HWND      hFinfoBox;
HWND      hStatBox;
HWND      hStatText;
HWND      hAbortBtn;
HWND      hStartBtn;
SFT_FHan  hXferHdl;        // Service layer handle
};
Public interface:
long FAR PASCAL AF_WndProc(  // message processor for
    file xfer window
HWND hWnd,              // handle to window getting
    message
unsigned message,       // message being sent
WORD wParam,            // information about message
LONG lParam);           // more information about
    message
BOOL AF_Event(          // Callback function for SF
WORD wParam);           // event to process
```

File Transfer Events

Messages processed from network—see RA.H for these messages.

Messages processed from user: OK, Cancel, Abort, Open, etc.

Messaging (AM) Module

Purpose:
The AM module serves to provide services for transmitting messages to another node and receiving messages from other nodes.

Description:
This module provides all functions and processing of user-to-user messages.

```
Public Interfaces:
long FAR PASCAL AM_WndProc(  // message processor for
    messaging window
HWND hWnd,              // handle to window getting
    message
unsigned message,       // message being sent
WORD wParam,            // information about message
LONG lParam);           // more information about
    message
BOOL AM_Send(           // Send a message
char *sMsg);            // message to send
BOOL AM_Recv(           // A message has been received
char *sMsg);            // message received
```

Events

Details of the messages processed from network are included in a header file (e.g. RA.H). Also included are messages processed from user such as Send, Cancel, Close, etc.

Voice control (AV) Module

Purpose:
The AV module performs voice functions.

Description:
This service must allow for establishment of a call (either initiated using a phone number, or in intercepting and acknowledging an incoming call indication) and allow ISDN type keys to be delivered t the ISDN switch during the source of this call. It should also inform the application of incoming call indications, along with the calling number ID. This could augment the release of an appropriate 'B' channel by the HSDT software so that the incoming call can be accepted.

```
Data Structures:
/*  information structure for the phone window       */
    typedef struct
{
WND hActCtrl;            /* child window control handle   */
AT_CoHan xConnHdl;       /* RA handle for this connection */
WND hNumEdit;            /* handle to number edit field   */
WND hNameText;           /* handle to name text field     */
char xzNum[DNC_MAX];     /* stripped call ID number       */
WND hStatText;           /* handle to status message      */
WND hHoldBtn;            /* handle to hold button         */
WND hDropBtn;            /* handle to drop button         */
WND hTrnsBtn;            /* handle to transfer button     */
WND hConfBtn;            /* handle to conference button   */
WND hDdirBtn;            /* dialing dir button handle     */
} AVS_CONN_DATA;
Public Interface:
long FAR PASCAL         /* for phone window messages     */
AV_WndPrc(
HWND hWnd,              /* wind handle getting message   */
WORD message,           /* message being sent            */
WORD wParam,            /* information about message     */
LONG lParam);           /* information about message     */
HWND AV_Setup(          /* Set up a new connection       */
int SetupType);         /* reason for phone window
                           setup                         */
void AV_Cleanup(        /* Destroy a phone connection    */
HWND hWnd);             /* handle to phone window        */
BOOL AV_Event(          /* Callback function for RA      */
WORD wParam);           /* event to process              */
Voice Events:
```

Details of these messages are included in a header file (e.g. VX.H) and include all messages of the format VXM_Vxxx, where "xxx" are alphanumeric characters.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A method for maintaining a plurality of ISDN circuit-switched channels in an ISDN, including at least one physical interface, used for performing various communication tasks including transferring ISDN data between subscriber stations, each of the channels having a known bandwidth, where at least one of the subscriber stations includes a computer having an internal bus and at least one ISDN terminal adaptor for coupling the channels to the internal bus, the method comprising the steps of:

linking several of the plurality of channels into a single logical connection;

synchronizing the channels of said single logical connection to permit the ISDN data to be transferred to a second subscriber station at a first rate greater than the rate available on any one of the linked ISDN circuit-switched channels; and inputting selection data to the computer representative of a desired communication bandwidth, said selection data being utilized during said step of linking to link the several of the plurality of channels into said single logical connection.

2. The method as claimed in claim 1 wherein said step of linking includes the step of logically matching the channels of the at least one subscriber station to the channels of the second subscriber station, to support the step of synchronizing.

3. The method as claimed in claim 1 wherein said step of synchronizing includes the step of segmenting the data based on the bandwidth of each of the channels of the single logical connection to obtain segmented data.

4. The method as claimed in claim 3 further comprising the step of simultaneously transferring the segmented data on the channels of the logical connection to the second subscriber station in the network at the channels' respective data rates.

5. The method as claimed in claim 1 further comprising the step of modifying the single logical connection to obtain a modified logical connection, the step of modifying including the step of synchronizing the channels of the modified logical connection to permit ISDN data to be transferred at a second rate different from the first rate.

6. The method as claimed in claim 5 wherein said step of modifying includes the step of releasing one of the channels of the single logical connection and linking the remainder of the channels into the modified logical connection.

7. The method as claimed in claim 6 wherein said step of modifying includes the step of releasing one of the channels of the single logical connection and linking the remainder of the channels and at least one other channel into the modified logical connection.

8. The method as claimed in claim 6 wherein said step of modifying includes linking the channels and at least one other channel into the modified logical connection.

9. The method as claimed in claim 1 further comprising the step of transferring files including data over the single logical connection to the second subscriber station in the network, the step of transferring utilizing substantially the total bandwidth of the channels of the single logical connection.

10. The method as claimed in claim 9 further comprising the step of transferring messages over the single logical connection to the second subscriber station in the network.

11. The method as claimed in claim 1 or claim 9 or claim 10 wherein a telephone is coupled to the at least one terminal adapter, one of the channels not associated with the single logical connection being coupled to the internal bus by the terminal adapter to provide a voice connection between the at least one subscriber station and a destination having a voice telephone, such as the second subscriber station.

12. The method as claimed in claim 1 wherein two of the channels of the single logical connection form at least part of separate ISDN physical interfaces.

13. The method as claimed in claim 1 wherein two of the channels of the single logical connection form at least part of the same ISDN physical interface.

14. The method as claimed in claim 1 wherein the single logical connection is formed utilizing channels from a plurality of physical interfaces.

15. The method of claim 1 wherein the computer is a personal computer.

16. The method of claim 5 or claim 9 wherein the data appears to a user to be transferred as a single bit stream.

17. The method as claimed in claim 1 or claim 10 further comprising the step of receiving a file including data over the single logical connection from the second subscriber station in the network to obtain a received file.

18. The method as claimed in claim 17 further comprising the step of storing the received file.

19. The method as claimed in claim 1 further comprising the step of receiving a message over the single logical connection from the second subscriber station in the network to obtain a received message.

20. The method as claimed in claim 19 further comprising the step of displaying the received message.

21. The method as claimed in claim 1 further comprising the steps of storing a directory of names and a number of associated destination numbers corresponding to a like number of subscriber stations and utilizing one of the destination numbers during the step of linking.

22. In an ISDN system for performing various communication tasks including transferring ISDN data between subscriber stations over a plurality of ISDN circuit-switched channels, each of the channels having a known bandwidth, at least one of the subscriber stations including apparatus comprising:

a computer having an internal bus and at least one ISDN terminal adapter for coupling the channels to the internal bus;

linking means associated with the computer for linking several of the plurality of channels into a single logical connection;

synchronizing means associated with the computer for synchronizing the channels of the single logical connection to permit the ISDN data to be transferred to a second subscriber station at a first rate greater than the rate available on any one of the linked ISDN circuit-switched channels; and data input means associated with the computer for inputting selection data to the computer representative of a desired communication bandwidth, said linking means being responsive to said selection data for linking the several of the plurality of channels into the single logical connection.

23. The apparatus as claimed in claim 22 wherein said linking means includes means for logically matching the channels of the at least one subscriber station to the channels of the second subscriber station, to support the step of synchronizing.

24. The apparatus as claimed in claim 22 wherein said synchronizing means includes segmenting means for segmenting the ISDN data based on the bandwidth of each of the channels of the single logical connection to obtain segmented ISDN data.

25. The apparatus as claimed in claim 24 further comprising first means for simultaneously transferring the segmented ISDN data on the channels of the logical connection to the second subscriber station in the network at the channels' respective data rates.

26. The apparatus as claimed in claim 22 further comprising means for modifying the single logical connection to obtain a modified logical connection, said synchronizing means synchronizing the channels of the modified logical connection to permit ISDN data to be transferred at a second rate different from the first rate.

27. The apparatus as claimed in claim 26 wherein said means for modifying includes release means for releasing one of the channels of the single logical connection, said link means linking the remainder of the channels into the modified logical connection.

28. The apparatus as claimed in claim 26 wherein said means for modifying includes release means for releasing one of the channels of the single logical connection, said linking means linking the remainder of the channels and at least one other channel into the modified logical connection.

29. The apparatus as claimed in claim 26 wherein said means for modifying includes said linking means for linking the channels and at least one other channel into the modified logical connection.

30. The apparatus as claimed in claim 22 further comprising first means for transferring files including ISDN data over the channels of the single logical connection to the second subscriber station in the network, the first means for transferring utilizing substantially the total bandwidth of the channels of the single logical connection.

31. The apparatus as claimed in claim 30 further comprising second means for transferring messages over the single logical connection to the second subscriber station in the network.

32. The apparatus as claimed in claim 22 or claim 30 or claim 31 further comprising a telephone coupled to the at least one terminal adapter, one of the channels of the single logical connection being coupled to the internal bus by the terminal adapter to provide a voice connection between the at least one subscriber station and a destination having a voice telephone, such as the second subscriber station.

33. The apparatus as claimed in claim 22 wherein two of the channels of the single logical connection form at least part of separate ISDN physical interfaces.

34. The apparatus as claimed in claim 22 wherein two of the channels of the single logical connection form at least part of the same ISDN physical interface.

35. The apparatus as claimed in claim 22 wherein the single logical connection is formed utilizing channels from a plurality of physical interfaces.

36. The apparatus of claim 22 wherein the computer is a personal computer.

37. The apparatus of claim 23 or claim 30 wherein the transfer of ISDN data appears to a user to occur as a single bit stream.

38. The apparatus as claimed in claim 22 or claim 30 further comprising first means for receiving a file including ISDN data over at least one of the channels of the single logical connection from the second subscriber station in the network to obtain a received file.

39. The apparatus as claimed in claim 38 further comprising a storage until coupled to the first means for receiving and storing the received file.

40. The apparatus as claimed in claim 22 or claim 31 further comprising second means for receiving a message over the single logical connection from the second subscriber station in the network to obtain a received message.

41. The apparatus as claimed in claim 40 further comprising a video monitor coupled to the second means for receiving and displaying the received message.

42. The apparatus as claimed in claim 22 further comprising a directory of names and a number of associated destination numbers corresponding to a like number of subscriber stations, the linking means utilizing one of the destination number for transferring the ISDN data.

43. In an ISDN system for performing various communication tasks including transferring ISDN data between first and second subscriber stations over a plurality of ISDN circuit-switched channels, each of the channels having a known bandwidth, each of the first and second subscriber stations including apparatus comprising:
  a computer having an internal bus and at least one ISDN terminal adapter for coupling the channels to the internal bus;
  linking means associated with the computer for linking several of the plurality of channels into a single logical connection;
  synchronizing means associated with the computer for synchronizing the channels of the single logical connection to permit the ISDN data to be transferred between the first and second stations at a rate greater than the rate available on any one of the linked ISDN circuit-switched channels; and
  data input means associated with the computer for inputting selection data to the computer representative of a desired communication bandwidth, said link means being responsive to said selection data for linking the several of the plurality of channels into the single logical connection.

44. The method as claimed in claim 12 further comprising the step of receiving a message over the single logical connection from the second subscriber station in the network to obtain a received message.

45. The method as claimed in claim 44 further comprising the step of displaying the received message.

* * * * *